United States Patent [19]
Ross et al.

[11] Patent Number: 6,016,423
[45] Date of Patent: *Jan. 18, 2000

[54] MOBILE COMMUNICATOR SYSTEM

[75] Inventors: David J. Ross, Leesburg, Va.; Blake L. Isaacs, Logan, Utah; Kevin J. Williams, Eugene, Oreg.

[73] Assignee: AMSC Subsidiary Corporation, Reston, Va.

[ * ] Notice: This patent is subject to a terminal disclaimer.

[21] Appl. No.: 08/796,769

[22] Filed: Feb. 6, 1997

Related U.S. Application Data

[63] Continuation of application No. 08/445,777, May 22, 1995, Pat. No. 5,613,223, and a continuation-in-part of application No. 08/187,996, Jan. 28, 1994, Pat. No. 5,512,912, said application No. 08/445,777, is a continuation-in-part of application No. 08/408,526, Mar. 22, 1995, Pat. No. 5,594,953.

[51] Int. Cl.[7] ................................................. H04B 1/08
[52] U.S. Cl. ............................................. 455/90; 455/575
[58] Field of Search .............................. 455/575, 90, 128, 455/347–349, 12.1, 345; 340/323 R, 990, 991, 825.37; 361/680, 681, 752, 757, 814; 364/424.01, 449; 219/506

[56] References Cited

U.S. PATENT DOCUMENTS

| | | | |
|---|---|---|---|
| 3,819,906 | 6/1974 | Gould, Jr. | 340/825.37 |
| 4,258,421 | 3/1981 | Juhasz et al. . | |
| 4,419,655 | 12/1983 | May | 340/323 R |
| 4,688,026 | 8/1987 | Scribner et al. . | |
| 4,745,564 | 5/1988 | Tennes et al. . | |
| 4,793,477 | 12/1988 | Manning et al. . | |
| 4,884,208 | 11/1989 | Marinelli et al. . | |
| 4,897,642 | 1/1990 | DiLullo et al. . | |
| 5,014,206 | 5/1991 | Scribner et al. . | |
| 5,129,605 | 7/1992 | Burns et al. . | |
| 5,175,873 | 12/1992 | Goldenberg et al. | 455/347 |
| 5,303,393 | 4/1994 | Noreen et al. | 455/12.1 |
| 5,373,458 | 12/1994 | Bishay et al. | 361/680 |
| 5,383,091 | 1/1995 | Snell | 455/90 |
| 5,479,285 | 12/1995 | Burke | 361/681 |
| 5,512,912 | 4/1996 | Ross et al. . | |
| 5,594,953 | 1/1997 | Ross et al. | 455/575 |
| 5,613,223 | 3/1997 | Ross et al. | 455/575 |

OTHER PUBLICATIONS

The Electronic Motorist, IEEE Spectrum, pp. 37–48, Mar. 1995.
Remote Sensing, IEEE spectrum, pp. 24–31, Mar. 1995.

*Primary Examiner*—Thanh Cong Le
*Attorney, Agent, or Firm*—Irah H. Donner; Pepper Hamilton LLP

[57] ABSTRACT

A bracing system protects and secures the internal components of a mobile communication system. The bracing system includes an upper housing comprised of a shock resistant material. The upper housing includes a monitor cavity, elevated portions surrounding the monitor cavity and formed in the upper housing, and elastomer sections disposed on the elevated portions. In addition, the upper housing includes a breakage resistant transparent material placed on the elastomer sections and in conformity with the monitor cavity, a display monitor being protected by the breakage resistant material, and a shock absorbing material disposed around the peripheries of the breakage resistant transparent material and the display monitor. The shock absorbing material is mounted to at least one of the breakage resistant transparent material and the display monitor. The upper housing also includes a mounting bracket biasing the display monitor to the upper housing and the breakage resistant material, and mounted to the upper housing, an integral keyboard formed of a water resistant material including elevated keys and mounting holes arranged around the periphery and between selected keys, and a first printed circuit board including switches selectively activated in response to depression of the elevated keys and mounted to the upper housing through the mounting holes in the integral keyboard.

25 Claims, 16 Drawing Sheets

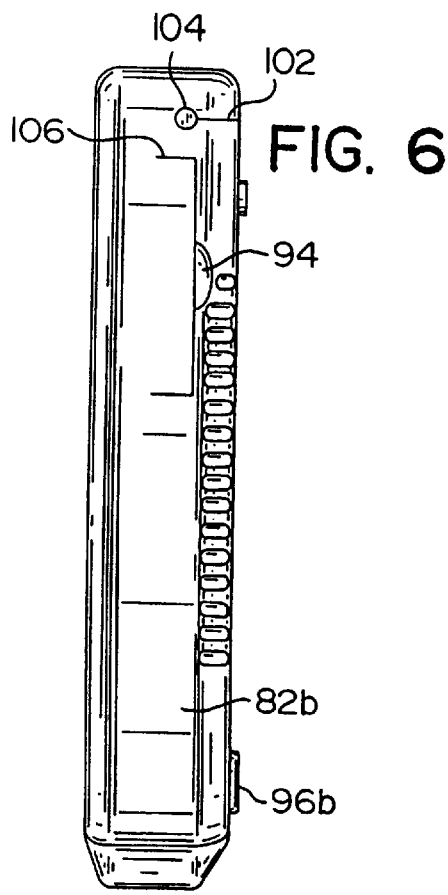
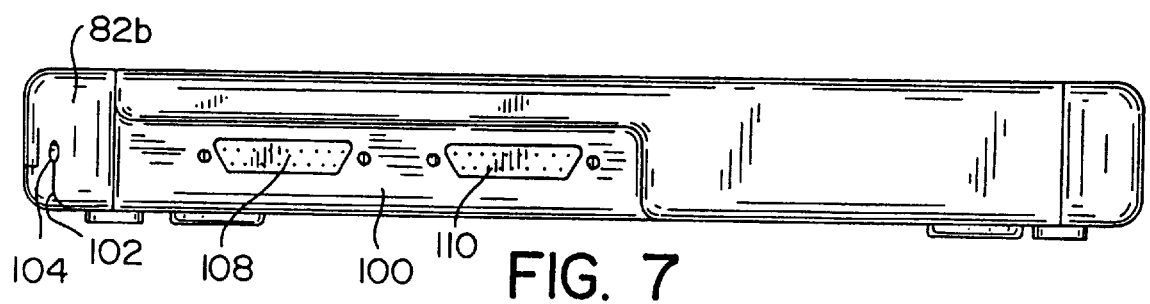

MOBILE COMMUNICATOR SYSTEM

RELATED APPLICATION

This application is a continuation of application Ser. No. 08/445,777 filed May 22, 1995 now U.S. Pat. No. 5,613,223 which is a continuation-in-part of U.S. patent application Ser. No. 08/408,526 filed Mar. 22, 1995 now U.S. Pat. No. 5,594,953, and U.S. patent application Ser. No. 08/187,996 filed Jan. 28, 1994 now U.S. Pat. No. 5,512,912.

TECHNICAL FIELD

The present invention relates generally to a mobile communicator system used in vehicles under adverse environmental and external conditions, and more particularly to a mobile communicator system used in vehicles under adverse environmental and external conditions for receiving and transmitting information from, for example, a central control point, other vehicles or land based stations via a satellite system.

BACKGROUND ART

In general, various techniques have been proposed to prevent damage to freight or cargo due to rough handling and/or road conditions. Rough handling is generally related to slack action within a vehicle transporting freight, usually due to poor vehicle handling or by driving the vehicle at excessive speeds. Rough handling and irregularities along the transport route has created additional expenses by forcing shippers and customers to make considerable expenditures on blocking, bracing, and otherwise attempting to cushion the freight being transported. Accordingly, it has become necessary to track instances of rough cargo handling and irregular transport routes to take appropriate measures to protect the cargo.

One prior technique has proposed to monitor the position of the vehicle itself for collecting and storing information during predetermined events. This prior technique, however, does not address the problem of damage occurring to cargo during a transport route. Such a system is described in U.S. Pat. No. 5,014,206 to Scribner et al. In this system only the location of the vehicle is generally determined and recorded during the occurrence of events detected by sensors which respond to such an occurrence. The system is associated with navigational units to receive positional information from a navigation system. The location of the vehicle is stored in a data collector on the vehicle. The date and time of the events may also be stored along with the positional information. The position is determined by means of a navigation system such as GPS or LORAN. The stored information is later transported to an information delivery point and downloaded to a data processing system. Here the information is analyzed to determine the exact location and time of the occurrence of the events, such as the closure of a passenger door of a taxi or bus, or the pickup of waste by a truck.

As illustrated in FIGS. 1 and 3 of Scribner et al., a truck 10 is equipped with a lift arm sensor 18 and rear door sensor 24 which are coupled electrically to a navigational system such as a GPS type system. The truck also has a passive radio transmitter in the form of tag 30 mounted on it. One such tag is described in U.S. Pat. No. 4,688,026 issued to the same inventors. The purpose of this transmitter is to transmit the truck identification number to a base data receiver/computer unit 32 which may be located at the depot where the truck is returned and housed. When the truck leaves the depot, an RF signal from the receiver/computer unit 32 causes the tag 30 to transmit the truck identification to the receiver/computer 32. The receiver/computer records the time, date and truck identification number. On returning to the depot the tag 30 again transmits the truck identification number to the data receiver/computer unit 32. The information contained in the data collector 28 may then be downloaded into the base receiver unit 32. This information may consist of (1) the identification number of the truck, (2) the day, time, latitude and longitude of each occurrence of the lift arm actuating its sensor, and (3) the day, time, latitude and longitude of each occurrence of actuation of the rear door sensor. However, Scribner et al. does not recognize, address or relate to the problem of damage caused to cargo during a transport route.

Prior techniques have also considered the effect of vehicle acceleration on the cargo for detecting cargo impact. U.S. Pat. No. 4,745,564 to Tennes et al. describes an impact detection apparatus for measuring and recording acceleration or other physical quantities experienced by easily damaged items of commerce such as fruit, or electronic computers. A triaxial accelerometer or other suitable sensor produces signals which are stored in a memory along with the times of the events which trigger the accelerometer. This provides an event-time history which later may be read from the memory for analysis after the handling or transportation is completed.

Control of the acceleration to which cargo carrying vehicles are subjected can be exerted is described in U.S. Pat. No. 5,129,605 to Burns et al. Burns et al. describes a vehicle positioning system using a plurality of inputs such as a GPS receiver, wheel tachometer, O.S. circuits, transponders and manual inputs from locomotive engineers.

Systems exist for continuously establishing and indicating the location of vehicles such as cars, trucks and boats. Such a system is described in U.S. Pat. No. 4,884,208 to Marinelli et al., which is directed primarily towards theft prevention. In this system a master tracking station receives and stores signals representative of the object identification and the location of the object, and may provide a visual indication of the object identification code and object location. Only vehicle location is detected.

The occurrence of events along a transport route is mapped out in U.S. Pat. No. 4,793,477 to Austill et al. However, this system does not include the use of a transmitter, from which information is downloaded into a central controller via a communication system. Nor is location information fed into a sensing module on the vehicle. Rather, the event location is determined by sensing and recording the degree and direction of track curvature for the rails on which the vehicle is travelling.

One technique has recognized the need to map the occurrence of predetermined conditions along a transport route travelled by a mobile sensing station. The mobile sensing station is connected to a central controller via a communication system. The mobile sensing station continuously senses for the occurrence of the predetermined conditions along the transport route. When these conditions are detected, data regarding these conditions are stored, as well as time and date data corresponding to the subject occurrences. Positional data are also received and correlated with the occurrence. The mobile sensing station is then triggered to transmit the correlated data over the communication system to a central controller. The correlated data are arranged so that a map of the transport route can be displayed, showing the locations of the predetermined conditions for future or current reference and to avoid such predetermined conditions. This technique is disclosed in U.S. Ser. No. 08/022,037 entitled "System for Mapping Occurrences of Predetermined Conditions in a Transport Route" to James Christopher Buck and assigned to American Mobile Satellite Corporation, incorporated herein by reference.

However, none of the aforementioned systems have considered the problem of adverse environmental and external conditions experienced by a mobile communicator used in vehicles for receiving and transmitting information from, for example, a central control point, other vehicles or land based stations via a satellite system. Accordingly, it has been discovered that these mobile communicators are subjected to unusually adverse conditions which result from these environmental or external forces or sources. It has further been discovered that it is beneficial to be informed of these types of adverse conditions in a real-time like manner, thereby providing the ability to correct or avoid such adverse conditions before the mobile communicator can no longer operate.

It has also been discovered that, at times, these adverse external conditions result from the improper handling of the mobile communicator operator. It has been discovered that these mobile communicators need to be extra durable to resist these types of adverse external conditions. Accordingly, specialized handling and safety features have been determined to be necessary.

It has also been discovered that these mobile communicators are experiencing failures due to poor and improper assembly of parts embedded within the mobile communicator.

It has further been discovered that these mobile communicators are experiencing adverse conditions resulting, in part, in the inability to properly removably secure the mobile communicator when in use.

It has further been discovered that these mobile communicators are experiencing adverse conditions resulting, in part, from the complicated or elaborate wiring which is necessary for the operation of the mobile communicator.

SUMMARY OF THE INVENTION

It is a feature and advantage of the present invention to prevent adverse conditions experienced by a mobile communicator from causing the mobile communicator to malfunction or fail.

It is another feature and advantage of the present invention to provide information of these types of adverse conditions which are experienced by the mobile communicator in a real-time like manner.

It is another feature and advantage of the present invention to provide the ability to correct or avoid such adverse conditions before the mobile communicator can no longer operate or function properly.

It is another feature and advantage of the present invention to provide a mobile communicator that is extra durable to resist these types of adverse external conditions.

It is another feature and advantage of the present invention to provide specialized handling and safety features for the mobile communicator.

It is another feature and advantage of the present invention to prevent failures occurring to the mobile communicator due to poor and improper assembly of parts embedded within the mobile communicator.

It is another feature and advantage of the present invention to provide a modularized assembly of parts embedded within the mobile communicator for efficient and cost effective assembly.

It is another feature and advantage of the present invention to provide a modularized assembly of parts embedded within the mobile communicator which minimizes damage to the parts as a result thereof.

It is another feature and advantage of the present invention to simplify the wiring configuration of the mobile communicator to inhibit adverse conditions resulting from complicated or elaborate wiring.

It is another feature and advantage of the present invention to permit the mobile communicator to be properly removably secured when in use.

The present invention is based, in part, on the identification of the problem of the unusual external conditions experienced by the mobile communicator. Accordingly, many mobile communicators have been designed in a manner which is inadequate to withstand these external conditions. The mobile communicators have been subjected to malfunctions and complete failures as a result of not recognizing the above problems.

The present invention is also based, in part, on the identification of the problem of the unusual external conditions experienced by the mobile communicator which damage the components mounted therein. Accordingly, the present invention addresses this problem by providing a component bracing system which braces and protects the components embedded within the mobile communicator system.

To achieve these and other features and advantages of the present invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, and a fleet management system including a central controller. The central controller receives/transmits the satellite message from/to the satellite communication switching office. The central controller maps occurrences of predetermined conditions along a transport route responsive to the satellite message received from the vehicle via the satellite and the satellite interface system. The predetermined conditions are detected using a mobile sensing station mounted on the vehicle traversing the transport route. Alternatively, the controller receives data in the satellite message received from the vehicle. The mobile communication system includes a housing having a shock resistant material. The housing includes end bumpers of an elastomeric material for absorbing shock experienced by the housing. The end bumpers each include recessed handles on an upper surface of the mobile communicator system and ribbed protruded finger grips on a bottom surface of the mobile communication system. The mobile communication system also includes an input device for inputting data. The input device comprises a keyboard including a rubber/carbon membrane and mounted in the housing using a first seal to prevent fluid from entering the mobile communication system between the input device and the housing. The mobile communication system also includes a central processing unit disposed in the housing that receives either data from the input device or sensor data received from the mobile sensing station. The sensor data includes predetermined condition data occurring along the transport route, positional data, and time and date data corresponding to each occurrence of the predetermined condition data. The central processing unit also outputs satellite data to the satellite interface system for transmission to the satellite. The mobile communication system further includes a display monitor comprised of tempered glass having the ability to withstand a predetermined impact. The display monitor is mounted in the housing using a second seal to prevent fluid from entering the mobile communication system between the display monitor and the housing.

In addition, the present invention includes a mobile communication system provided in a mobile satellite system. The mobile communication system includes a housing having a shock resistant material. The housing includes end bumpers of an elastomeric material for absorbing shock experienced by the housing. The end bumpers each include recessed handles on an upper surface of the mobile communicator system and ribbed protruded finger grips on a bottom surface of the mobile communication system. The mobile communication system also includes an input device for inputting data. The input device comprises a keyboard including a rubber/carbon membrane and mounted in the housing using a first seal to prevent fluid from entering the mobile communication system between the input device and the housing. The mobile communication system also includes a central processing unit disposed in the housing that receives data from the input device. The central processing unit also outputs satellite data to the satellite interface system for transmission to the satellite. The mobile communication system further includes a display monitor comprised of tempered glass having the ability to withstand a predetermined impact. The display monitor is mounted in the housing using a second seal to prevent fluid from entering the mobile communication system between the display monitor and the housing.

In another embodiment, the mobile communication system including a bracing system for protecting and securing the internal components. The bracing system includes an upper housing comprised of a shock resistant material. The upper housing includes a monitor cavity, elevated portions surrounding the monitor cavity and formed in the upper housing, and elastomer sections disposed on the elevated portions. In addition, the upper housing includes a breakage resistant transparent material placed on the elastomer sections and in conformity with the monitor cavity, a display monitor being protected by the breakage resistant material, and a shock absorbing material disposed around the peripheries of the breakage resistant transparent material and the display monitor. The shock absorbing material is mounted to at least one of the breakage resistant transparent material and the display monitor. The upper housing also includes a mounting bracket biasing the display monitor to the upper housing and the breakage resistant material, and mounted to the upper housing, an integral keyboard formed of a water resistant material including elevated keys and mounting holes arranged around the periphery and between selected keys, and a first printed circuit board including switches selectively activated in response to depression of the elevated keys and mounted to the upper housing through the mounting holes in the integral keyboard. The bracing system also includes a lower housing comprised of another shock resistant material. The lower housing includes a second printed circuit board including a central processing unit, and mounted to the lower housing, and a support mounted to the lower housing and extending in a direction toward the upper housing and through the second printed circuit board.

In another embodiment, the present invention provides a method of assembling the internal components of the mobile communicator system having upper and lower housings. The method includes the step of assembling an upper housing comprised of a shock resistant material and having a monitor cavity and keyboard receiving area. The upper housing assembling step includes the steps of positioning elastomer sections around the monitor cavity on the inside of the upper housing, and positioning a breakage resistant transparent material on the elastomer sections and in conformity with the monitor cavity. The elastomer sections being positioned between the monitor cavity and the breakage resistant transparent material. The method further includes the steps of positioning a shock absorbing material disposed around the peripheries of the breakage resistant transparent material, and positioning a display monitor on the shock absorbing material. The shock absorbing material is positioned between the display monitor and the breakage resistant transparent material. The method also includes securing the display monitor to the upper housing, positioning an integral water resistant keyboard in the keyboard receiving area, and positioning a printed circuit board switch array on the keyboard. The method also includes securing the peripheries of the printed circuit board and the keyboard to the upper housing through first mounting holes on the periphery of the keyboard, and securing the internal areas of the printed circuit and the keyboard to the upper housing through second mounting holes between selected keys of the keyboard. The method also includes the step of assembling a lower housing comprised of another shock resistant material and including a support extending in a direction toward the upper housing, including securing a second printed circuit board having a central processing unit and a receiving hole to the lower housing. The method also includes the steps of assembling the upper and lower housings together, and securing bumper handles on opposite ends of the assembled upper and lower housings.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 6 is a right side elevational view of the mobile communicator system;

FIG. 7 is a rear elevational view of the mobile communicator system;

FIGS. 14-1–14-2 are exploded views of the mobile communicator system;

BEST MODE FOR CARRYING OUT THE INVENTION

Figure 1:
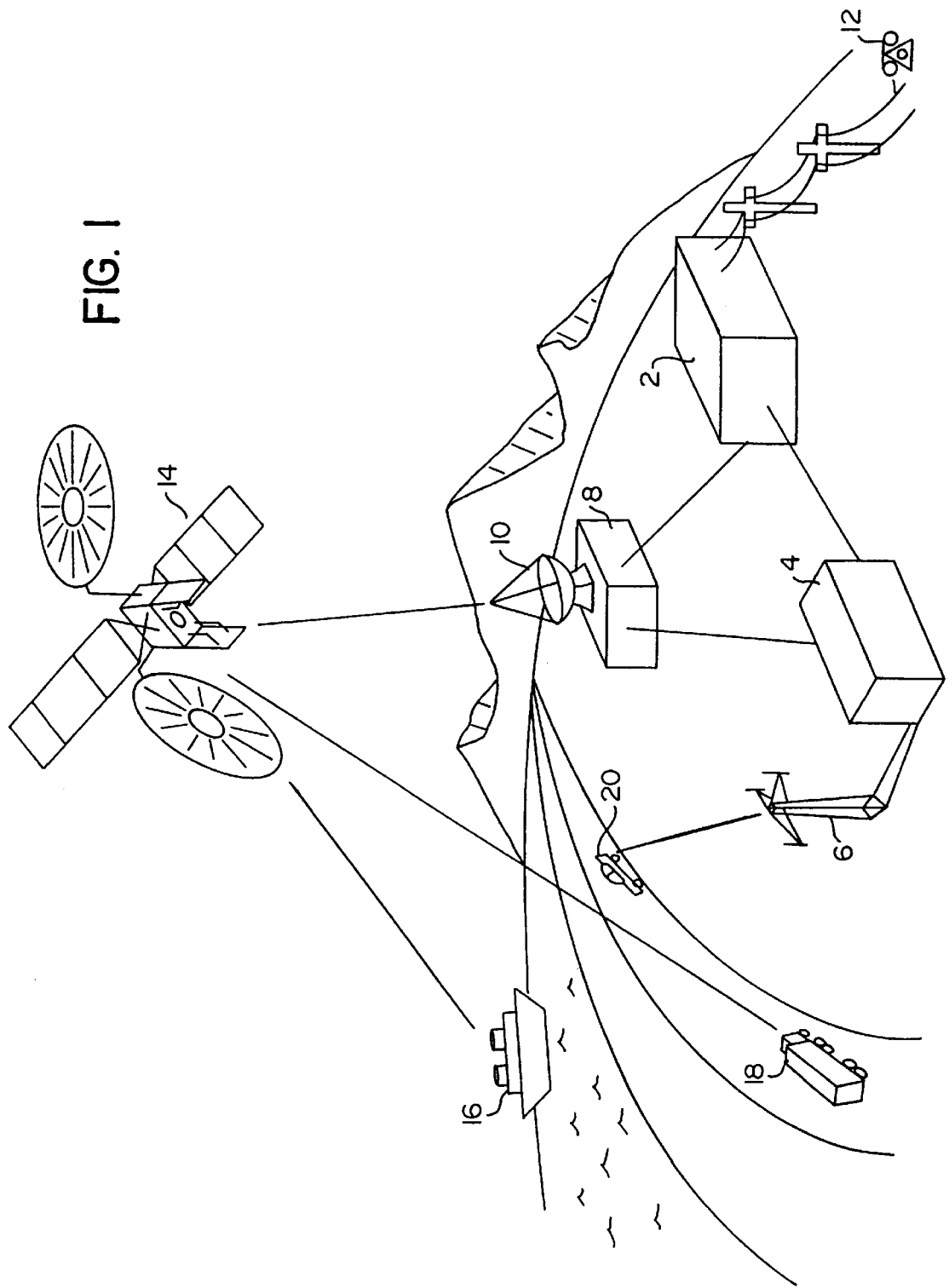
FIG. 1 is a diagram of the overall mobile communicator system.

FIG. 1 illustrates the general layout of a system for effectuating the present invention. A vehicle 18, usually transporting cargo, moves along a transport route. The route can be one that is well known, or it can be one that is being newly travelled by the vehicle. The vehicle is preferably equipped with at least one mobile sensing station, which functions to detect predetermined events or conditions (such as collisions or impacts, potholes or uneven tracks or the like) along the travel route, and transmit data regarding those conditions using the mobile communicator system (not shown) via orbiting satellite 14 to a remote satellite ground station 8 via satellite antenna 10. The satellite ground station 8 transfers the data received from the mobile communicator system to a dispatch or fleet management center to analyze and evaluate the data.

Part of the data transmitted from the mobile sensing station is positional data received or detected from satellite 14 which is part of a satellite navigation system. Examples of presently available systems are LORAN or the current Global Position System (GPS).

Navigational data sent to the mobile sensing station preferably utilizes a Standard-C data protocol format, which is commonly used in the maritime industry. Experience has indicated that this is the most reliable method of sending navigational data from one mobile station to another. However, other navigation or location systems can be used. For example, a series of radio repeaters located along a predetermined route can track the location of a specific vehicle and can be used to send location data to the mobile communicator as is done by satellite 14 in FIG. 1. Also, other data transfer formats can be used, depending on the navigational system, the transport route, the vehicle and the communication system for transmitting data from the mobile communicator system.

While FIG. 1 illustrates communication between the mobile communicator system in vehicle 18 to satellite 14, the mobile communicator system may also communicate with the fleet management center by means of a cellular telephone system. In this variation, the mobile communicator system carries a cellular transceiver capable of automatically accessing cellular ground station 4 as it passes from one cell into another. While such equipment may be more complex and expensive than the satellite uplink embodied in FIG. 1, it facilitates easy communication of instructions from the central controller to the mobile sensing station. Currently available examples of dual cellular and satellite communication systems include, for example, Westinghouse Series 1000 satellite/cellular mobile telephone or Mitsubishi DiamondTel Series satellite/cellular mobile telephone.

The fleet dispatch center includes a central controller that stores the data sent from the mobile communicator system and arranges it so that it can be used in a display indicating the occurrence of predetermined conditions along the route travelled, for example, by vehicle 18. The central controller is expected to handle data from a variety of routes, each travelled by a plurality of vehicles having mobile sensing stations. Since the data are preferably transmitted from the mobile communicator system in ASCII format, the user terminal can access selected data from the central controller using a personal computer (PC), a modem and standard communication software.

With the appropriate software, a display of the desired transport route can be generated at the PC terminal, and the conditions along the transport route can be updated as information is received from various vehicles having mobile communicator systems travelling along that route. For example, boat 16 in FIG. 1 also includes a mobile communicator system for communication with satellite 14. In addition, even vehicles or subscribers who do not contain the mobile communicator system can communicate with the mobile communicator system. For example, vehicle 20 may communicate with satellite 14 via cellular antenna 6, cellular switching office 4, satellite ground station 8 and satellite antenna 10. Similarly, plain old telephone service (POTS) telephone 12 may also communicate with satellite 14 via switching office 8, satellite ground station 8 and satellite antenna 10. Thus, the mobile communicator system may be used to exchange data from among various different vehicles.

Figure 2:
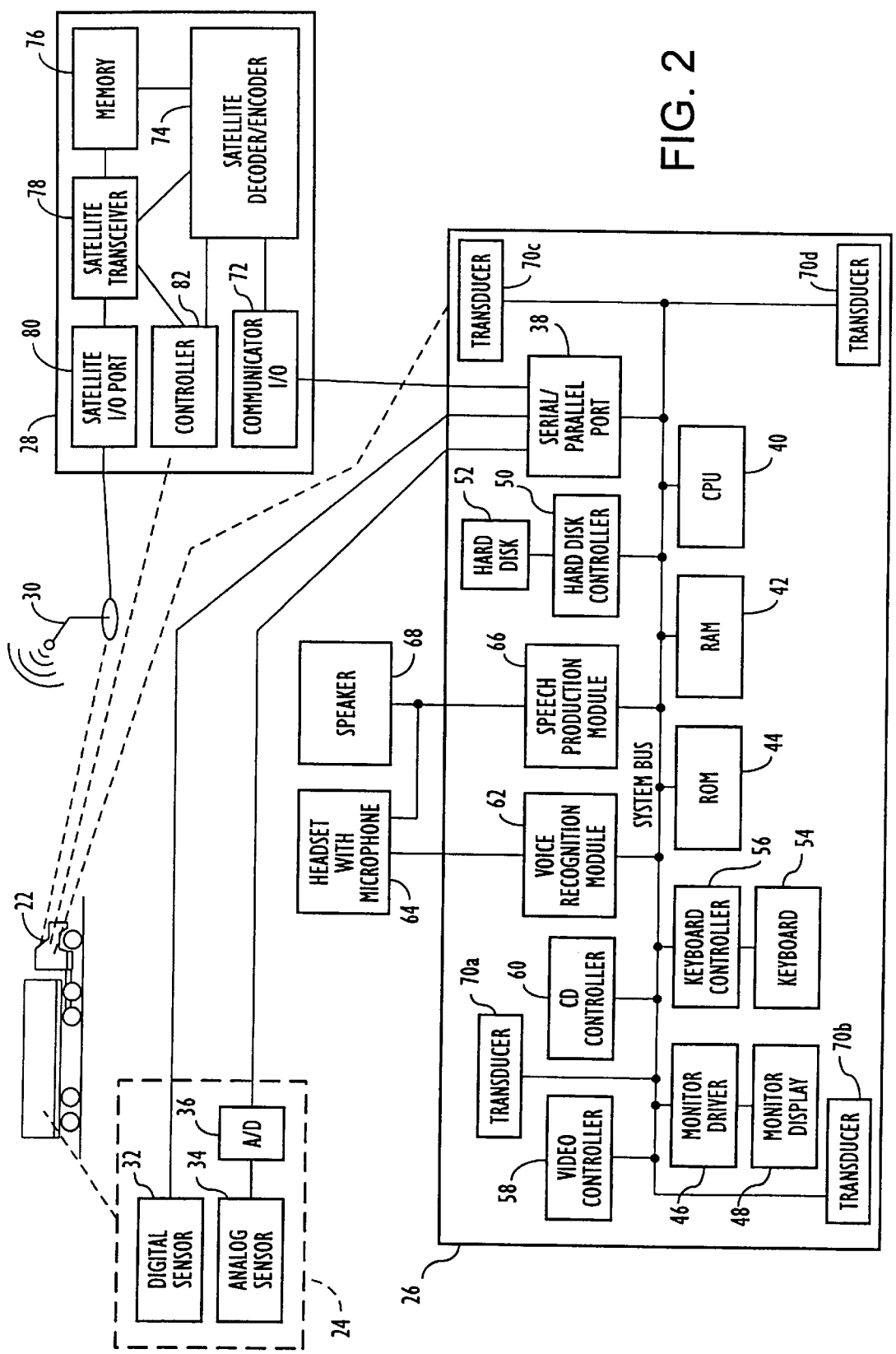
FIG. 2 is a block diagram illustrating the electrical elements contained in the mobile communicator system.

FIG. 2 is a block diagram illustrating the elements contained in the mobile communicator system. In FIG. 2, sensor module 24 located in vehicle 22 can be of a single sensor type or of a plurality of different types connected so that indication of a variety of predetermined conditions can be transmitted to mobile communicator 26. For example, sensor module 24 preferably includes digital sensor 32 and analog sensor 34. Analog sensor 34 is equipped with analog to digital (A/D) converter 36 which converts the analog signals into digital signals for transmission to mobile communicator system 26.

Sensor module 24 can be used to detect a variety of different vehicle conditions, transport route conditions, and cargo conditions. In one embodiment, the sensor module 24 includes an accelerometer capable of three-axis measurement of acceleration vs. time. In many cases, this is the only sensor data that is needed to determine if transport route conditions are appropriate for the cargo being transported.

Mobile communicator system 26 receives the sensor data from sensor module 24 and correlates the data for transmission to the satellite. Mobile communicator system 26 includes input/output serial/parallel port 38 for receiving the sensor data from sensor module 24, and for outputting the correlated sensor data to satellite interface system 28. In addition, serial/parallel port 38 also receives and transmits other data which may be exchanged between the mobile communicator system 26 and, for example, a fleet dispatch center, via the satellite. Data to be transmitted to and received from the satellite may be displayed on display 48 via monitor driver 46. The data may also be printed to a printer connected to the parallel port of serial/parallel port 38, or broadcasted on speaker 68 via speech recognition module 66. Mobile communicator system 26 also includes video controller 58 for display of data on an external monitor.

Data is entered in the mobile communicator system 26 via, for example, any one of keyboard 54 using keyboard controller 56, microphone 64 using voice recognition module 62, hard disk 52 via hard disk controller 50, or via an external compact disk via compact disk controller 60. Each of the various devices are connected to central processing unit (CPU) 40 via the system bus.

CPU 40 performs the processing or operations of mobile communicator system 26 as described above. CPU 40 is conventional, and may be, for example, an IBM compatible 286 or 386 type processor with between 640 K–2 MB of random access memory (RAM) and from 20–50 MB of read/write/delete storage such as a standard hard disk 52. CPU sends the correlated data to satellite interface system 28 which transmits the correlated data to the satellite via antenna 30. It is a feature of the invention that a transceiver can be used for transmitting the data.

It is not necessary that the location data be transmitted at the same time as the data regarding the occurrences of the predetermined conditions from the mobile communicator system 26 to the satellite. Under some system conditions, data regarding the occurrence of the predetermined conditions may be sent as soon as the triggering operation occurs, and a proximity position report may follow within a few minutes. The coordination between the two types of data may be adjusted by CPU 40 based upon system parameters and other operating requirements as are necessary to provide a real-time data input of transport route conditions. For example, the second-by-second correlation of positional data with data regarding the predetermined conditions is not critical in a railway switching yard since the vehicle spends a substantial amount of time in the same location while being switched. On the other hand, a vehicle travelling at high speed along a transport route which may be unfamiliar will require positional data to be closely correlated with that of the predetermined conditions detected along the transport route.

Satellite interface system 28 receives data from the mobile communicator system 26 via communicator input/output port 72. The received data are then encoded in accordance with predetermined formats which are compatible for the different satellites orbiting the planet earth via satellite encoder/decoder 74. Satellite encoder/decoder 74 also compresses the data to maximize the efficiency of the communication between the satellite interface system 28 and the satellite. Memory 76 may be used to temporarily store the data which is encoded and compressed prior to transmission via satellite transceiver 78, satellite input/output port 80, and antenna 30. The various operations in satellite interface system 28 are coordinated and controlled by controller 82. Satellite interface system 28 may be comprised of any standard satellite interface system, such as the Trimble Galaxy Inmarsat Land Mobile Transceiver manufactured by Trimble Navigation of Sunnyvale, Calif. Additional interface systems are described in U.S. Pat. Nos. 4,884,208; 4,258,421; The Electronic Motorist, IEEE Spectrum, pp.37–48 (March 1995); and Remote Sensing, IEEE Spectrum pp. 24–31 (March 1995); all incorporated herein by reference.

Advantageously, in accordance with the discovery of the present invention, the mobile communicator system 26 preferably includes sensors, such as transducers 70*a*–70*d*. Transducers 70*a*–70*d* are used to determine the external conditions experienced by the mobile communicator system 26. Transducers 70*a*–70*d* are strategically placed to record, for example, shock or improper handling of mobile communicator system 26. The data generated from transducers 70*a*–70*d* are then transmitted to, for example, the fleet management center via satellite interface system 28 and the satellite in a similar manner as the data from the sensors in the vehicle described above. Thus, in accordance with the discovery of the present invention that the mobile communicators receive rough handling due to external conditions, mobile communicator system 26 includes transducers 70*a*–70*d* to determine when occurrences of these adverse conditions occur. The data may then be analyzed, for example, by the fleet management center or the mobile communicator system 26 itself to determine when such external conditions have occurred to assist in determining corrective measures to be taken to ensure the safe or correct handling of the mobile communicator system 26.

Mobile communicator system 26 also includes unique mechanical features which are described in greater detail below. These unique mechanical features provide additional protection for the mobile communicator system 26 in addition to the mobile communicator sensors.

Antenna 30 may be any standard satellite antenna such as the standard C & GPS antenna manufactured by Trimble Navigation of Sunnyvale, Calif. which is generally mounted directly to the vehicle. Alternatively, antenna 30 may be mounted to the vehicle using the antenna mount illustrated in FIG. 11.

Figure 11:
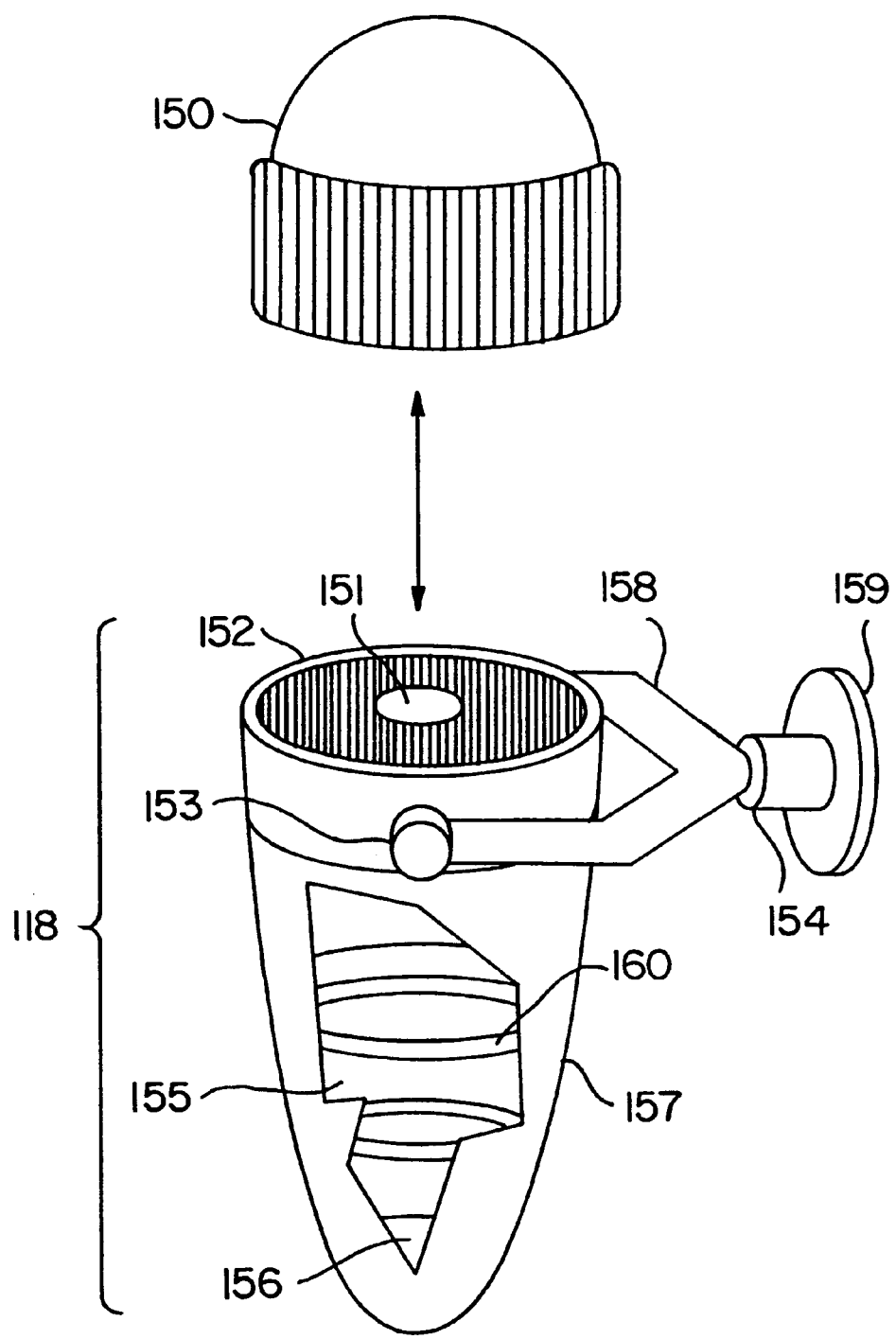
FIG. 11 is a diagram of an antenna mount used with the mobile communicator system.

In FIG. 11, radome 150 is shown in exploded view from ballast assembly 118. Radome 150 houses the satellite antenna 30 of the present invention. Mounting plate 152 on ballast assembly 118 is provided with female threaded portion 151 for receiving radome 150. Female threaded portion 151 may comprise, for example, a $5/16$–18 threaded hole.

Mounting plate 152 is attached to housing 157 of ballast assembly 118 which is mounted to yoke 158 via pitch gimbal 153. Mounting yoke 158 is attached to mounting bracket 159 via roll gimbal 154. Housing 157 contains weight 156 located at the bottom of housing 157. In the preferred embodiment, weight 156 comprises a lead weight, although other types of materials may be used which provide suitable mass. Within housing 157 lies dampening fluid 155, which may comprise a viscous fluid such as glycol.

The dampening characteristics of dampening fluid 155 are carefully chosen to provide the correct dampening for the antenna mount of FIG. 11. In addition, dampening fluid 155 is selected to provide a fluid which has appropriate freeze temperature characteristics so that dampening fluid 155 will not solidify in normal use. Further, dampening fluid 155 is selected such that the fluid has a relatively constant viscosity characteristics with respect to temperature.

In an alternative embodiment, pitch gimbal 153 and/or roll gimbal 154 may be provided with additional shock absorption devices. These devices may take the form of pneumatic or hydraulic dampeners or friction disks inserted in gimbal joint 153, 154 to dampen movement. In the preferred embodiment, a pneumatic dampener, such as an Air-Pot™ may be used at the rotational joints of gimbals 153, 154. Alternately, hydraulic or pneumatic dampeners 970 may be externally mounted. Friction disks may be inserted in gimbal joints 153, 154 with tension maintained on the disks by means of a spring mechanism (e.g., belleville washers or the like) so as to provide a predetermined friction within gimbal joint 153, 154. Alternately, other types of mechanical or hydromechanical dampening units known in the art may be applied to gimbal joints 153, 154. These shock absorption devices may be supplied to supplement dampening fluid 155 to aid in the dampening of large accelerations. During large accelerations, the dampening fluid 155 may tend to remain at the bottom portion of antenna mount 118 due to centripetal acceleration. The use of external shock absorbers delays the motion of antenna mount 118, causing displacement of dampening fluid 155 so as to establish the free-surface effect described below. Alternately, these additional shock absorption devices may serve to eliminate or substantially reduce movement of the antenna mount due to minor shocks or vibrations.

Housing 157 may be provided with a series of annular rings 160. Annular rings 160 are provided to alter the dampening action of dampening fluid 155 by providing additional surface area to housing 157 to interact with dampening fluid 155. For the sake of illustration, the antenna lead cable is not shown in FIG. 11. A suitable length of flexible lead cable, for example, may be provided to connect the antenna to shipboard communications equipment. Alternately, a coiled, flexible cable may also be used. In addition, the antenna unit may be self-contained, for example, for use as a self-powered emergency beacon. Finally, as would be readily apparent to one of ordinary skill in the art, contact brushes may be used at the gimbals in order to provide suitable electrical connections for the antenna. Any suitable technique may be used such that the antenna lead does not interfere with the movement of the antenna mount or act to alter the dampening of the system.

Figure 12:
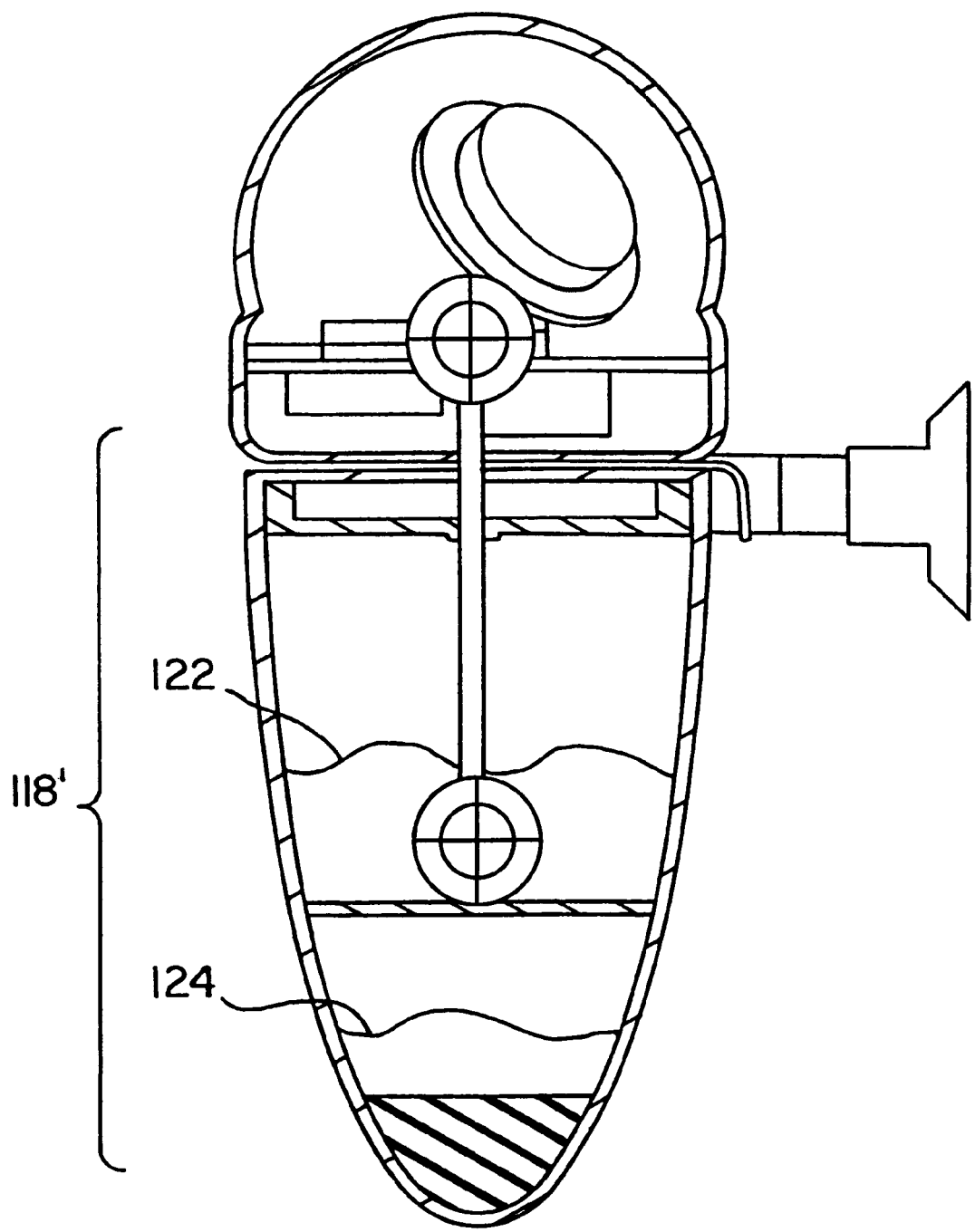
FIG. 12 is a diagram of an antenna mount used with the mobile communicator system.

FIG. 12 is a diagram of another antenna mount used with the mobile communicator system having similar construction as the antenna mount in FIG. 11. In FIG. 12, however, two separate fluid ballast compartments 122 and 124 are provided in ballast portion 118'. FIG. 12 shows an antenna which may be a directional or omnidirectional, mechanically or electronically steered antenna unit. The antenna has one center of gravity while the ballast portion 118' including the housing, dampening fluids, etc. has another center of gravity.

Although in the embodiment of FIG. 12 shows only two fluid ballast compartments 122 and 124, an additional number of fluid ballast compartments may also be used, stacked vertically. These ballast compartments may or may not contain annular baffles 160 shown in FIG. 11.

Both FIGS. 11 and 12 include a ballast weight comprised of a suitably dense material such as lead. Dampening fluids disposed in the fluid chambers preferably comprise a fluid in the viscosity range of 6 to 1000 centipoise, having a specific gravity range of 0.6 to 2.23 grams per centimeter squared. Both the specific gravity and viscosity of dampening fluids should be relatively constant over a broad temperature range (e.g., −40° C. to 100° C.) or at least remain within the above limits over this temperature range. Additional details of the above antenna mount in FIGS. 11 and 12 are disclosed in copending application Ser. No. 08/058,079 filed May 10, 1993, incorporated herein by reference. Alternatively, the antenna mounts in FIGS. 11 and 12 may also include a ballast tank containing fluid above the fulcrum point of the antenna mount, e.g., above gimbal joints 153, 154 in FIG. 11.

Figure 13:
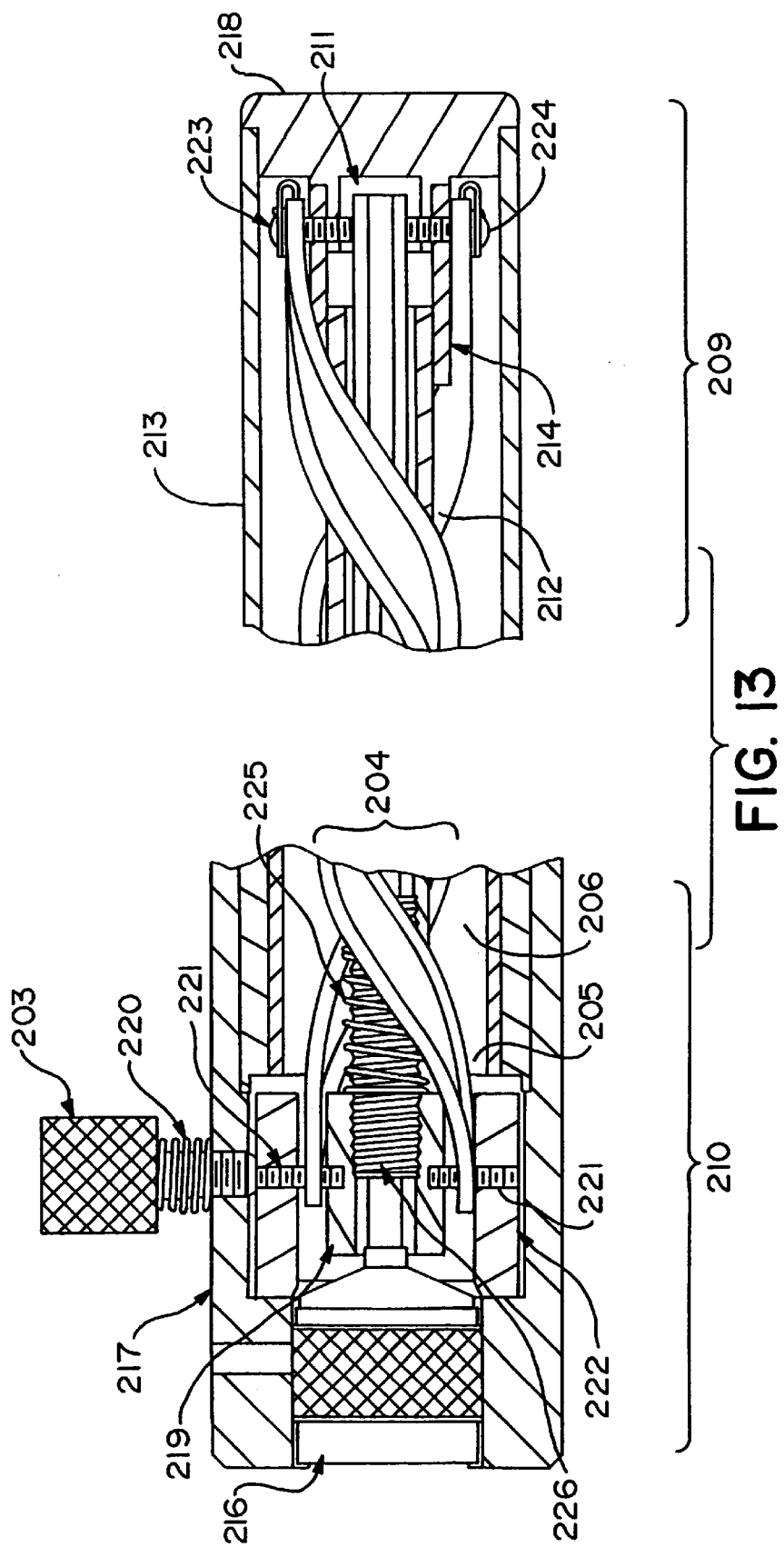
FIG. 13 is a diagram of an antenna used with the mobile communicator system.

FIG. 13 is a diagram of an antenna which may be used with the mobile communicator system. FIG. 13 shows a multi-turn bifilar helix antenna (hereinafter "antenna") using a mechanical design which permits the pitch and diameter of helix elements 205 and 206 to be adjustable. This mechanical adjustment elicits an electrical response in the radiation characteristics of the antenna which permits beam steering of the radiation pattern in the elevation plane. The antenna is capable of scanning its main radiation beam from 20° to 60° in elevation while maintaining relatively omni-directional coverage in azimuth.

A range of 20° to 60° is particularly suitable for use in the CONUS, as this range of elevation corresponds to the angles of inclination between a geostable satellite and locations throughout the CONUS. Other ranges of angles could, of course, be used if the antenna is to be used in another country or countries. A narrower range could be used in applications where the mobile vehicle is anticipated as having a limited range of travel. A fixed elevation angle could be chosen for stationary antennas or antennas used in local mobile applications. At the other extreme, an adjustment range could be provided from 0° (horizon) to 90° (zenith) to provide global coverage. The preferred range of 20° to 60° is shown here for use in the CONUS and is in no way intended to limit the scope of the invention.

The antenna is designed to mount to a detachable base 201 located on the vehicle skin (e.g., trunk, fender, roof or the like) 202. Its scanned radiation angle is set manually by the vehicle operator with the relatively simple adjustment of a knurled sleeve 222 at the base 217 of the antenna.

Bifilar helix 204 comprises two helix elements 205 and 206 separated 180° apart, but sharing a common axis. In the preferred embodiment, helix elements 205 and 206 have conductors made of a highly conductive material, such as copper. Helix elements 205 and 206 serve as the radiating portion of the antenna. Helix 204 has distal end 209 and proximal end 210. In general, the distal end 209 of the vertically mounted antenna is the end which is furthest from the ground plane formed by vehicle skin 202. The antenna is fed at distal end 209 with a balanced assembly comprising coaxial cable section 211 terminating in a balun 214. This distal feed technique is sometimes referred to as the backfire mode.

Helix elements 205 and 206 are formed by being wound around a constant diameter tube to form a uniform helix. The angle of pitch of helix 204 is determined by the number of helix turns for a given axial length. Pitch in unit length is defined as the axial length required for the helix to make one complete turn about its axis. When helix elements 205 and 206 are wound 180° apart as suggested above, a crisscross effect of the elements is observed when the structure is viewed from the side.

The spacing (helix diameter) and angle of pitch of helix 204 determines the polarization and radiation characteristics of the antenna. A bifilar helix with left-handed helices (ascending counter-clockwise as viewed from the bottom) radiates a right-hand circularly-polarized (RHCP) wave which is relatively omni-directional in azimuth. If the pitch angle and or the diameter of helix 204 is increased from an initial reference point, the radiation in elevation is scanned towards the horizon. In the present invention, the element pitch angle and helix diameter are adjusted by varying the number of helix turns for a fixed axial length.

In one embodiment, helix elements 205 and 206 are made from 300 ohm twin lead line commonly used in FM receivers and some television leads. One of the conducting leads is removed from the polypropylene sheathing of each of helix elements 205 and 206, while the remaining lead serves as the radiating element. Thus, helix elements 205 and 206 each contain only one wire.

Polypropylene was chosen because it readily takes a helix shape when wrapped around a metal tube (not shown) and heated with a hot air gun. Other heating techniques can also be used including heating the metal tube itself. Helical elements 205 and 206 may be formed from two 37 inch lengths of 300 Ohm twin lead line suitably modified as discussed above by stripping one of the leads from the sheathing. When wound six and one-half times around a ⅝ inch diameter tube, helical elements 205 and 206 are formed at an axial length of about 31 inches.

Formed helix elements 205 and 206 are placed over a 31 inch long ⅜ inch diameter hollow supporting tube 212 which may be made of any fairly robust insulating material such as phenolic resin. Supporting tube 212 is centrally located within a 32 inch long outer sheath 213 which is one inch in diameter. Outer sheath 213 also may be formed of any robust insulating material such as polycarbonate and serves to provide environmental sealing of the antenna assembly. Coaxial cable 211 is fed through the center of supporting tube 212 and is terminated at the distal end 209 at balun 214. Coaxial cable 211 may be formed from a UT141 semi rigid coaxial line.

Balun 214 comprises a hollow 3/16 inch diameter brass tube with two feed screws 223 and 224 located 180° apart. The wire portions of Helix elements 205 and 206 are secured to the termination of balun 214, one on each side, by feed screws 223 and 224. Proximal end 210 of coaxial line 211 is terminated by connector 216 which may be press fitted into base 217 of the antenna. Balun 214 serves to maintain a relative phase difference of 180° between the radiating elements for the required frequency bands.

In an alternative embodiment, balun 214 comprises a hollow 3/16 inch diameter slotted brass tube with two slots in the tube located 180°0 apart. The slots are 0.124 inches wide by 1.85 inches long. The wire portions of Helix elements 205 and 206 are soldered to the termination of balun 214, one on each side, separated by the slots.

Support tube 212 is captured at distal end 209 by end cap 218 set into distal end 209 of outer sheath 213 so as to prevent support tube 212 from rotating. End cap 218 is secured to distal end 209 of outer sheath 213 by glue, screws, threading, press fit, or the like.

Proximal end 210 of support tube 212 is movably attached to inner rotatable sleeve 219 by threaded member 226. Threaded member 226 may be, for example, a 1/4–20 threaded stainless steel sleeve. Spring 225 is installed at the point of rotation between support tube 212 and inner rotatable sleeve 219 to prevent undesired relative movement between inner rotatable sleeve 219 and support tube 212. Spring 225 may be made of, for example, stainless steel. Inner rotatable sleeve 219 is held in place by two set screws 221 within knurled adjustment outer sleeve 222. Inner sleeve 219 and outer sleeve 222 are located within base 217 which supports outer sleeve 213 and connector 216. The two grounded ends of helix elements 205 and 206 are attached to rotating set screws 221, creating a mechanism for changing helix pitch. Access to knurled outer sleeve 222 is made by machining two window slots (not shown) in the base 217. Base 217, inner sleeve 219 and outer sleeve 221 may be made from any suitable insulating plastic material with requisite strength requirements, such as DELRIN™ plastic.

Helix 204, preferably made of polypropylene, has the desirous property of maintaining a uniform pitch along its axial length, even when one end is rotated with respect to the other. By fixing proximal end 209 of helix elements 205 and 206 from rotation to balun 214 and attaching proximal ends 210 of helix elements 205 and 206 to rotatable outer sleeve 222, an elevation steerable antenna with fixed height and adjustable pitch is achieved.

In operation, the operator loosens knurled locking bolt 203 (held firm by spring 220) and twists knurled outer sleeve 221 through the two window slots (not shown) to adjust the axial pitch position of antenna 200. In its initial position, helix elements 205 and 206 make approximately six and one-half turns within the axial length of antenna 200. This allows for coverage within 20° above the horizon. In the other extreme, helix elements 205 and 206 make just under ten complete turns, allowing for coverage up to 60° above the horizon. A mechanical limiter (not shown) and elevation angle indicator (not shown) are used to prevent the user from forcing the helix elements beyond their six and one-half and ten turn limits and to simplify the process for optimizing the antenna for elevation coverage. The operator's choice of elevation angle can be determined from the latitude where the vehicle is located, or can be positioned with the aid of a standard electronic antenna peaking device. Additional details of the above antenna in FIG. 13 are disclosed in copending application Ser. No. 08/187,996 filed Jan. 28, 1994, incorporated herein by reference.

Figure 3:
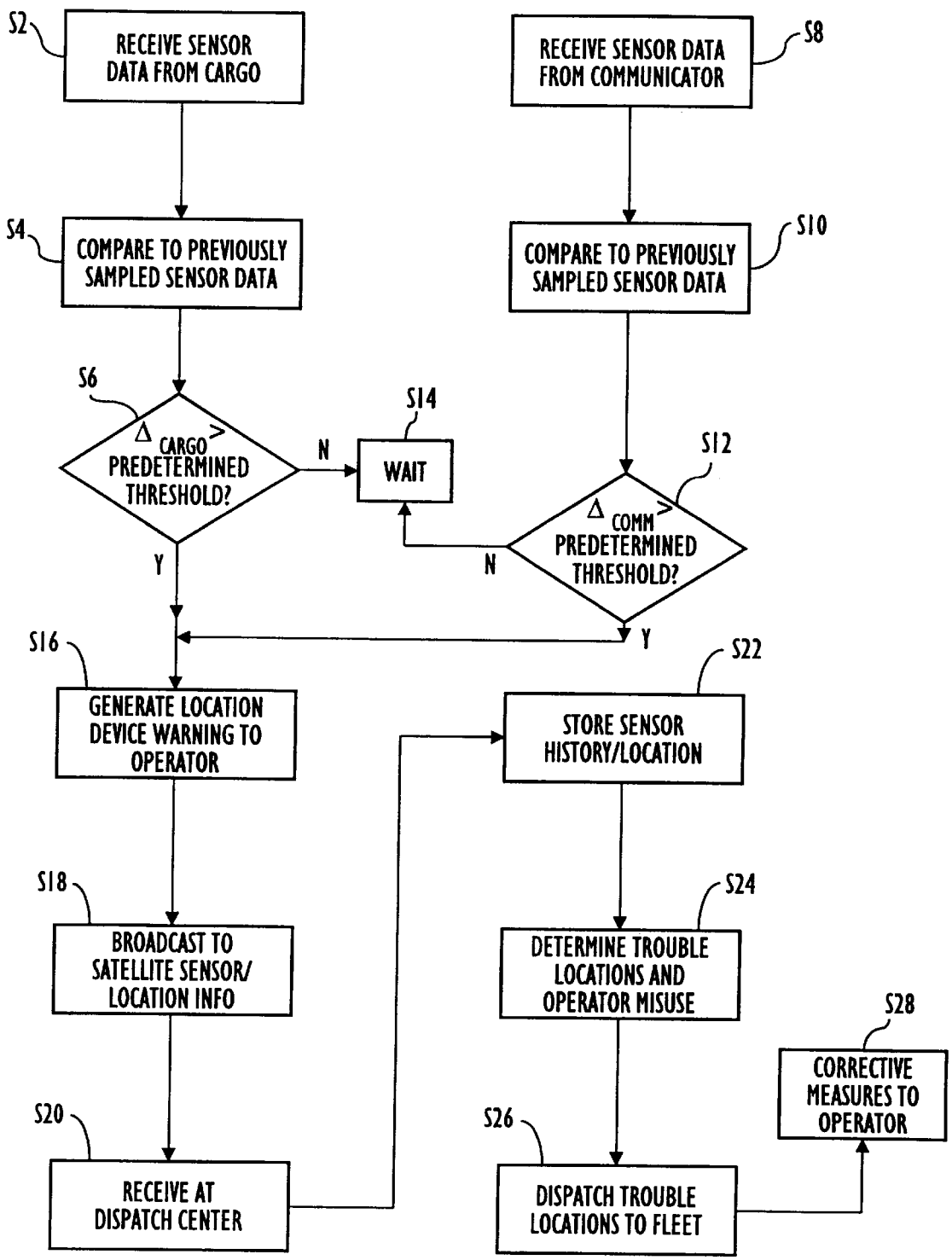
FIG. 3 is a flowchart illustrating the process implemented by the mobile communicator system.
Figure 4:
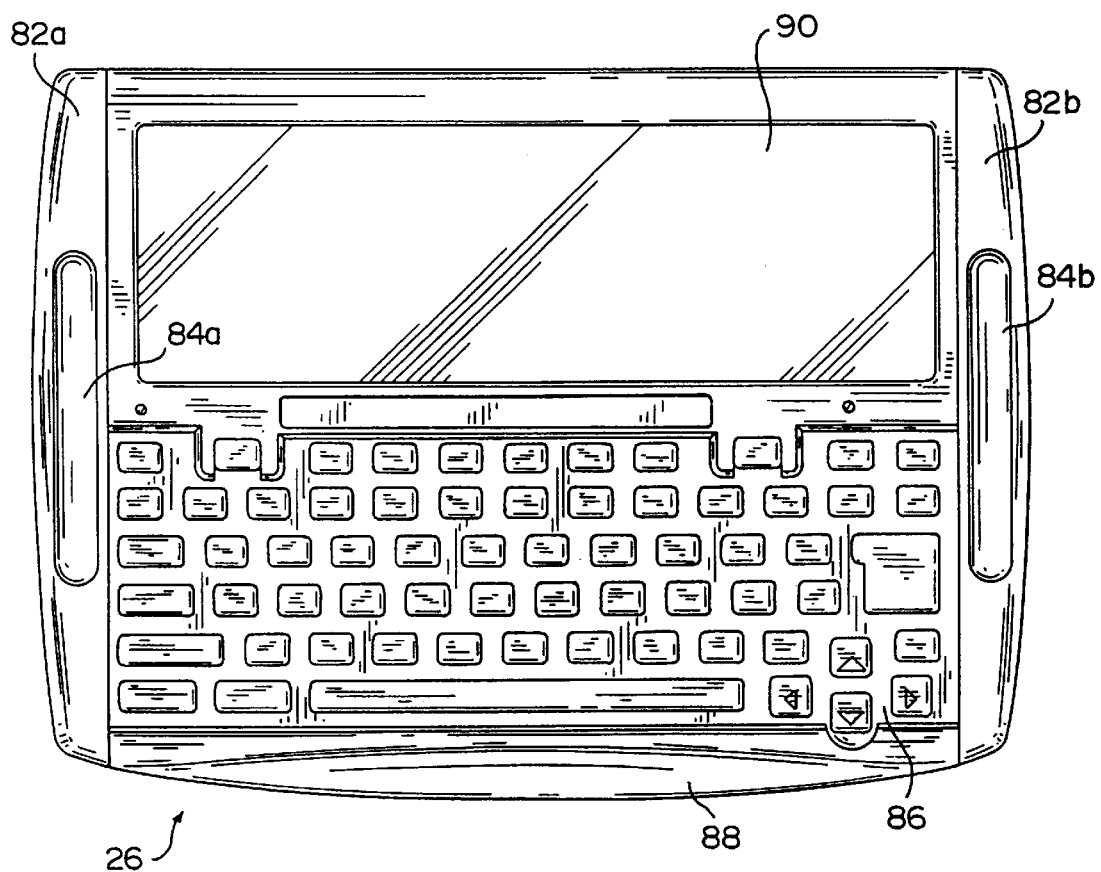
FIG. 4 is a top plan view of the mobile communicator system.
Figure 5:
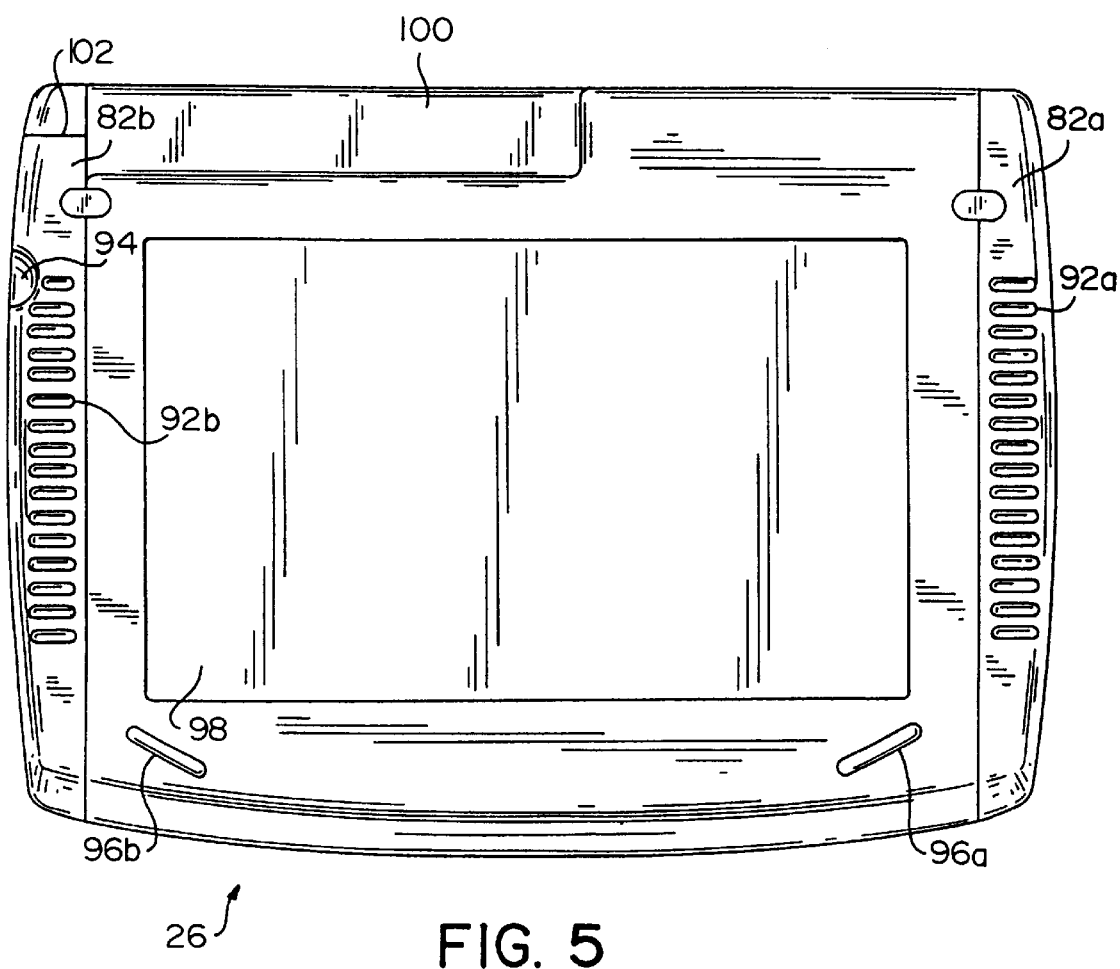
FIG. 5 is a bottom plan view of the mobile communicator system.
Figure 8:
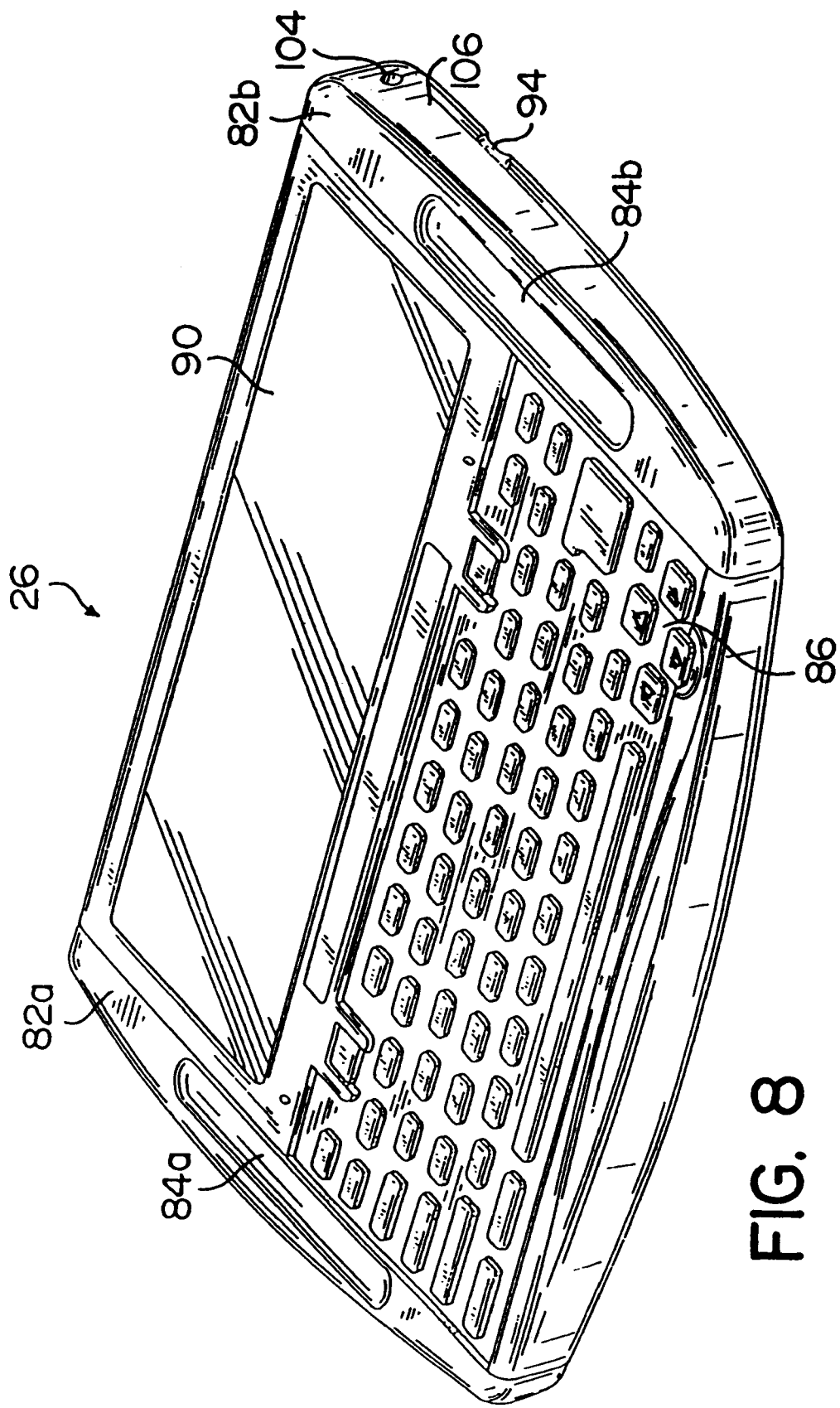
FIG. 8 is a perspective view of the mobile communicator system.

FIG. 3 is a flow chart illustrating the process implemented by the mobile communicator system. In FIG. 3, the mobile communicator system 26 receives sensor data from, for example, sensors located in the cargo area of vehicle in step S2. Mobile communicator system 26 then compares the previously sampled sensor data to the current sensor data in step S4, and determines whether or not the change in the data exceeds the predetermined threshold indicating that a significant change in the data has occurred in step 56.

Mobile communicator system 26 also receives sensor data from the communicator itself in step S8, for example, from transducers 70a–70d illustrated in FIG. 2. Mobile communicator system 26 then compares the previously sampled sensor data to the current sensor data in step S10, and determines whether the change in sensor data has exceeded a predetermined threshold magnitude in step 512.

If the change in sensor data in both steps S6 and S12 have not exceeded their respective threshold magnitudes, mobile communicator system 26 then waits for additional sensor data to be received in step S14. If either of steps S6 or S12 determine that the change in sensor data exceeds the predetermined threshold, mobile communicator system 26 generates a location device warning to the operator in step S16 indicating whether the cargo or mobile communicator system have experienced adverse conditions. In addition, this sensor data is also broadcast to the satellite including the location information of the vehicle in step S18, which data is then received at a dispatch center in step S20. The sensor history and location data are then stored in a central controller in the dispatch center in step S22, and the central controller determines the trouble locations and whether or not the mobile communicator device has experienced adverse conditions in step S24. The trouble locations are then dispatched to the fleet in step S26 as well as suggested corrective measures for the vehicle operator to perform with respect to preventing any future adverse conditions to the cargo or the mobile communicator system in step S28.

FIGS. 4–8 are different views of the mobile communicator system. In FIGS. 4–8, mobile communicator system 26 includes left and right end bumpers 82a, 82b, each with left and right recessed handles 84a, 84b disposed therein on the upper surface of end bumpers 82a, 82b. On the opposite side of end bumpers 82a, 82b are respectively positioned finger grips 92a, 92b which further provide traction for gripping mobile communicator system 26. Advantageously, end bumpers 82a, 82b with recessed handles 84a, 84b and finger grips 92a, 92b provide an effective way of protecting mobile communicator device 26 while being handled or gripped by the vehicle operator.

Mobile communicator device 26 further includes keyboard 86 with inclined palm rest 88 and display 90. Keyboard 86 is designed in such a manner to insure that no fluids which might be encountered by mobile communicator system 26 be permitted to pass therethrough. Accordingly, keyboard 86 is comprised of a standard rubber/carbon keyboard which, however, is sealed to the opening around the outer edges of mobile communicator system 26 corresponding to keyboard 86. In this manner, fluids which are spilled onto keyboard 86 will not enter the electrical components of the mobile communicator system 26 Resistive or mechanical switches may be disposed below keyboard 86 for selecting specific characters.

Display 90 also advantageously comprises a shock resistant material, such as tempered glass having a thickness of approximately 0.125 inches. Display 90 is sealed to the housing of mobile communicator system 26 using a seal material such as silicon foam applied to the outer edge of display 90 and the housing using an adhesive. The exterior housing of mobile communicator system 26 is preferably constructed of a shock resistant material, such as a polycarbonite, or G.E. Cycoloy type material. End bumpers 82*a*, 82*b* may comprise a elastomeric or silicon rubber. Accordingly, this extremely durable exterior of mobile communicator system 26 provides additional protection which was discovered to be necessary for such a device when used in a vehicle as described and contemplated.

Mobile communicator device 26 further includes the feature of steering wheel steps or rests, 96*a*, 96*b* which permit the vehicle operator to temporarily mount mobile communicator system 26 on the steering wheel for convenience of use. Further, mobile communicator device 26 includes recessed area 100 and cable outlet access 102 in right end bumper 82*b* for further organizing the various cables which may be connected to mobile communicator device 26, and for organizing the cables which are required to be plugged therein, for example, end cable plugs 108 and 110.

Mobile communicator system 26 also includes the advantageous features of sensors embedded therein to automatically determine mishandling of the mobile communicator system, together with a durable and shock resistant exterior. In addition, mobile communicator system 26 includes the conveniences of being able to temporarily mount the device on the steering wheel of a vehicle, as well as organizing the cables in a manner which minimizes the intrusiveness thereof. Finally, mobile communicator system 26 includes means which facilitates the easy handling of the device by providing hand grips on both sides of the device in the end bumpers.

Mobile communicator system 26 also includes PCMCIA port 106 which is covered by a rubber protective cap in which also includes recessed access portion 94 for opening the rubber cover to gain access to the PCMCIA port.

Figure 9:
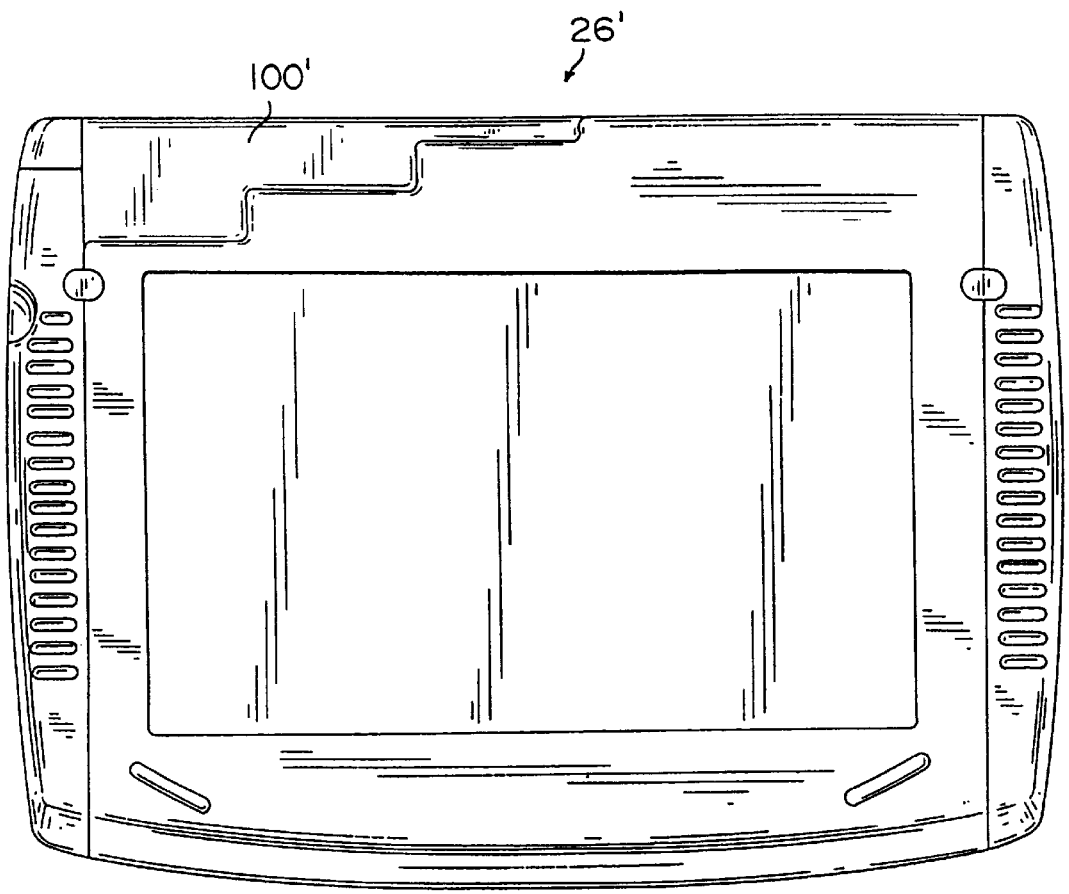
FIGS. 9–10 are respective bottom plan and rear elevational views of another embodiment of the mobile communicator system.
Figure 10:
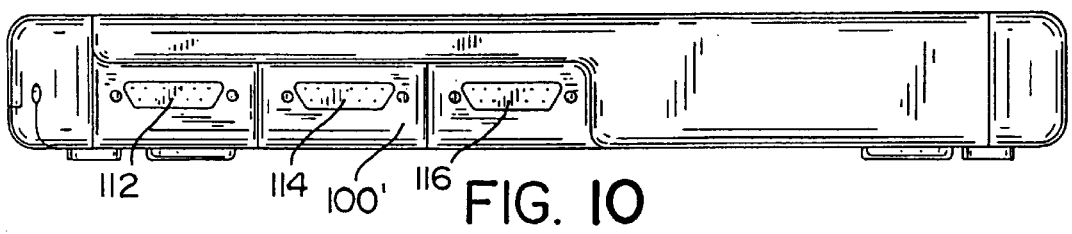

FIGS. 9–10 are respective bottom plan and rear elevational views of another embodiment of the mobile communicator system. The remaining views of mobile communicator device are essentially similar as described in connection with the first embodiment. As shown in FIGS. 9–10, mobile communicator device includes modified recessed area 100' which accommodates multiple input/output ports 112, 114, and 116. Advantageously, recessed area 100' is configured in a step like function or manner so that the corresponding cable ends for each of the cables do not interfere with each other and which permit the cables to be uniformly exited through exit hole 104 of right end bumper 82*b*.

Figures 1, 14:
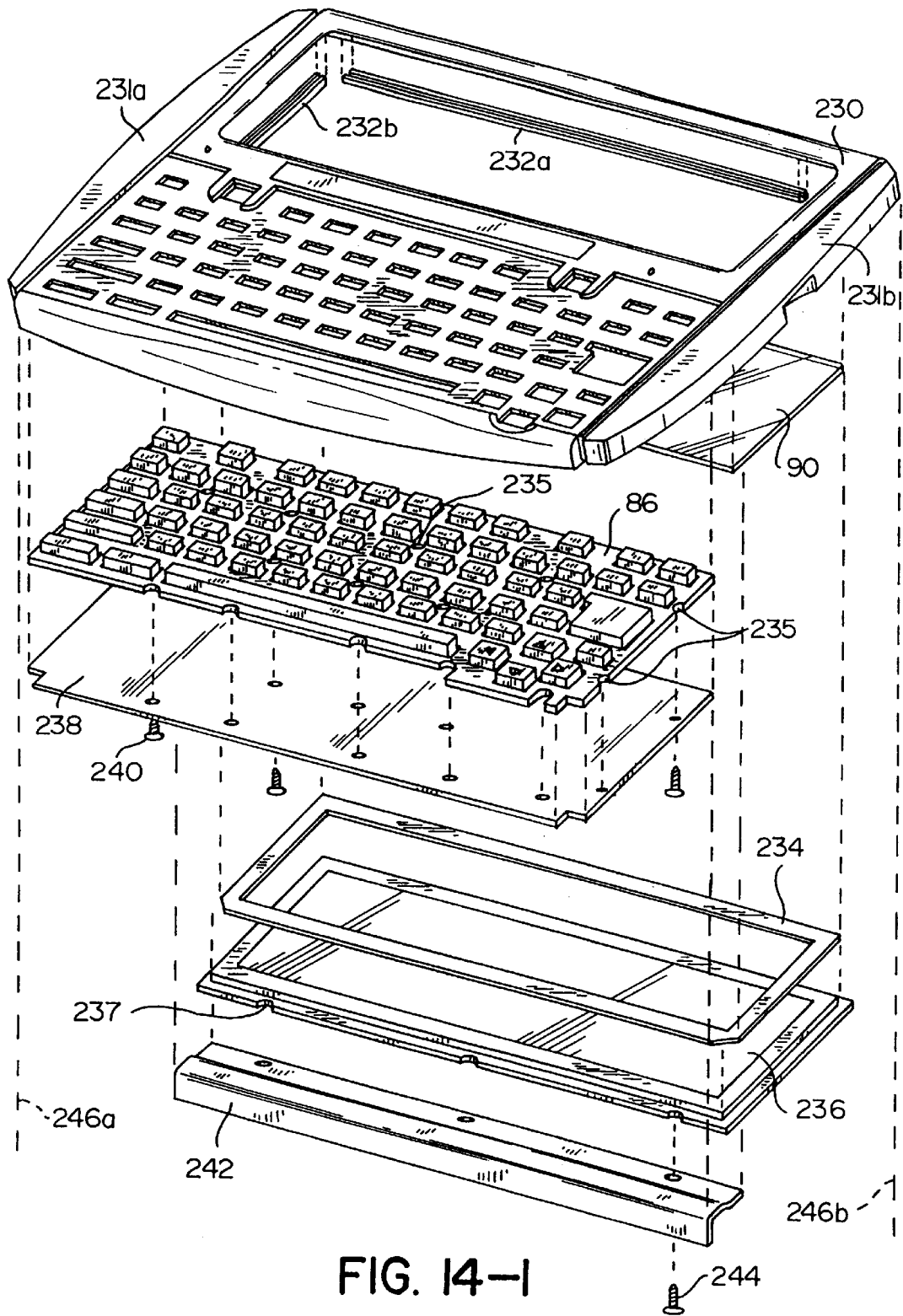
Figures 2, 14:
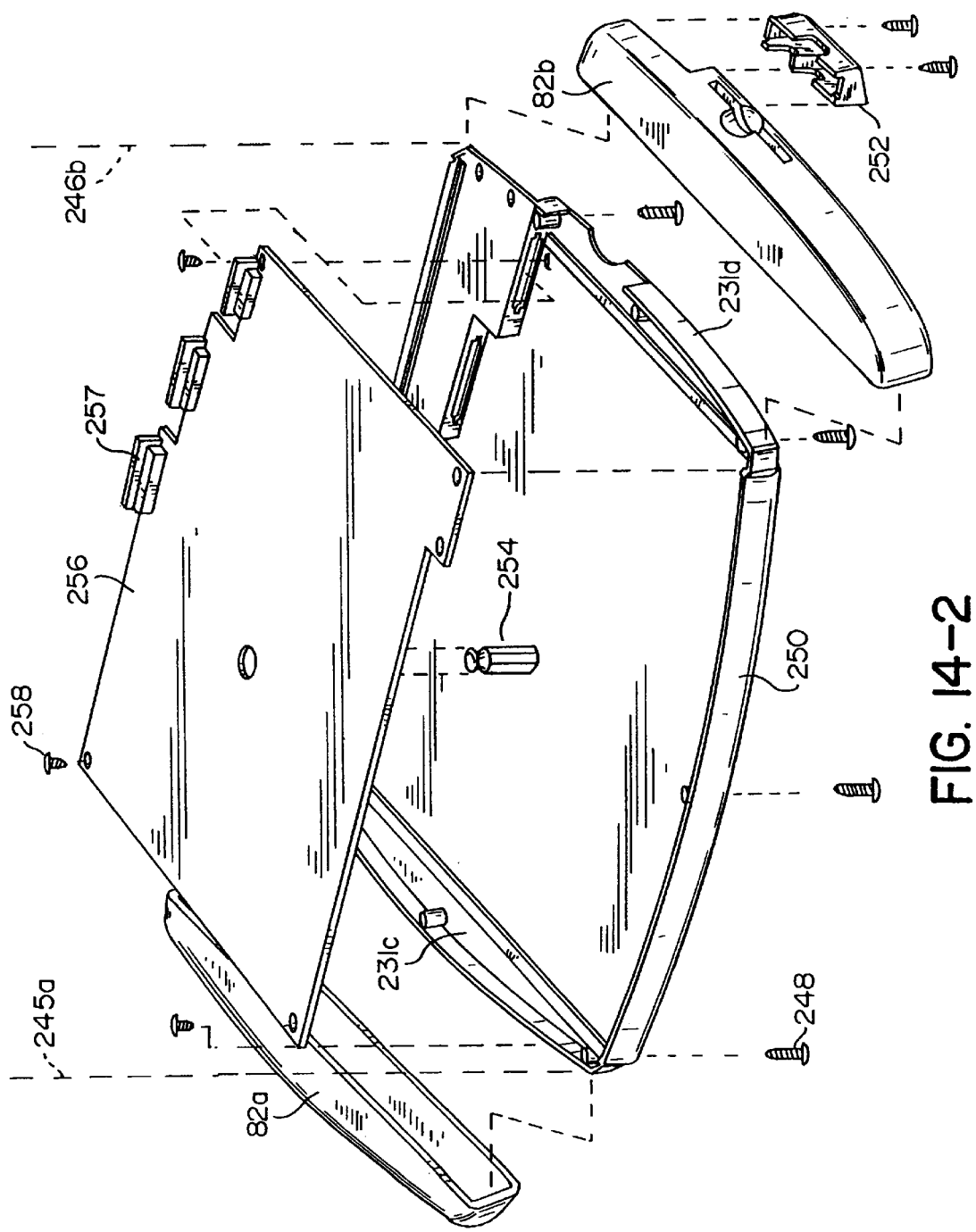

FIGS. 14-1–14-2 are exploded views of the mobile communicator system showing the inner components. FIG. 14-1 illustrates the construction of the upper portion of the mobile communicator system, while FIG. 14-2 illustrates the construction of the lower portion of the mobile communicator system. The upper and lower portions are assembled together as illustrated by dashed lines 246*a* and 246*b* and connection screws 248. Connection screws 248 are attached or mounted to female connectors mounted in the upper portion described in detail below in connection with FIG. 16.

The upper portion in FIG. 14-1 comprises upper casing 230 with upper handle receiving portions 231*a* and 231*b*. Upper handle receiving portions 231*a* and 231*b* are used for mounting end bumpers 82*a*, 82*b* illustrated in FIG. 14-2. End bumpers 231*a* and 231*b* advantageously serve to protect the mobile communicator system from adverse conditions, such as mishandling, falls, etc. Upper casing 230 includes elastomer sections 232*a* and 232*b* and tempered glass 90 for protecting monitor 236 used to display data transmitted and received between the mobile communicator system and a central control system, sensors, etc. Elastomer sections 232*a* and 232*b* are used to absorb shock experienced by the mobile communicator system, thereby protecting tempered glass 90 from being broken, chipped or shattered. Elastomer sections 232*a* and 232*b* are also used as a seal for the monitor portion of the mobile communicator system preventing or inhibiting the entrance of fluid therein. Similarly, tempered glass 90 protects monitor 236 from the external conditions experienced or encountered by the mobile communicator system.

An additional elastomer or foamed material 234 is advantageously disposed or arranged between tempered glass 90 and monitor 236. Foamed material 234 may be adhesively secured to either of the monitor 236 or tempered glass 90. Tempered glass 90 may be either chemically or heat treated tempered glass. However, we have discovered unexpectedly that for the mobile communicator bracing system application, heat treated tempered glass performs much better for he types of external conditions the mobile communicator will experience. An additional foamed material similar in construction to foamed material 234 may also advantageously be disposed between upper casing 230 and tempered glass 90. This additional foamed material provides enhanced protection for the tempered glass 90 and inner components by simultaneously providing additional shock distribution and a water resistant seal between the upper casing 230 and the tempered glass 90. Monitor 236 includes screw holes 237 advantageously shaped in the size of a "half moon." As will be described in detail below, screw holes 237 facilitate the easy removal of monitor 236 while maintaining connection of other components inside the mobile communicator system.

The upper portion of the mobile communicator systems also includes keyboard related components which are mounted to upper casing 230. In particular, keyboard 86 is comprised of a standard rubber/carbon keyboard which, however, is sealed to the opening around the outer edges of the mobile communicator system. In this manner, fluids which are spilled onto keyboard 86 will not enter the electrical components of the mobile communicator system. Thus, keyboard 86 includes mounting holes 235 around its periphery in a "half moon" shape as well as circular holes placed between the various elevated keys. Printed circuit board 238 includes resistive switches positioned below the keys of keyboard 86 for selecting specific characters. Screws 240 are used to mount printed circuit board 238 and keyboard 86 to upper casing 230 in a secure and water resistant or water proof manner as will be described in detail below. Screws 240 enter holes in printed circuit board 238 and mounting holes 235 around the periphery and within keyboard 86.

Mounting bracket 242 is then positioned above monitor 236 and printed circuit board 238 for securely mounting the keyboard and monitor components to upper casing 230 via screws 244. Screws 244 advantageously are not inserted in any circular hole in monitor 236, but rather are inserted in "half moon" shaped hole 237 of monitor 236, permitting easy removal and insertion of monitor 236 from upper casing 230. Thus, the pressure exerted from screws 244 on mounting bracket 242 and monitor 236 thereby holds or retains monitor 236 to upper casing 230.

The bottom portion of the mobile communicator system in FIG. 14-2 includes lower casing 250 with lower handle receiving portions 231c and 231d which cooperate with upper handle receiving portions 231a and 231b for mounting end bumpers 82a and 82b to the upper and lower casings 230 and 250. End bumper 82b is advantageously configured to include a recessed portion which receives cable securing member 252 mounted thereto.

Cable securing member 252 is used to affix or secure cables which are connected between input/output ports 257 of the mobile communicator system to external devices or destinations. Input/output ports 257 are connected to printed circuit board 256 which advantageously comprises the overall microprocessor circuitry for performing the processes of the mobile communicator system. Printed circuit board 256 is advantageously mounted to lower casing 250 via screws 258, and includes a center hole for receiving therethrough support 254. Support 254 is mounted to lower casing 250 and is used to maintain clearance between upper and lower casings 230 and 250 as well as prevent buckling of the upper and lower casings 230 and 250 together. Thus, support 254 is an important structural feature of the lower casing 250. Advantageously and significantly, support 254 includes at its upper surface a rubber or shock absorbing element that reduces or distributes the shock experienced by the mobile communicator and on its inner components. Thus, this additional shock absorbing element is also a feature of the structure of the mobile communicator bracing system.

FIGS. 14-1 and 14-2 therefore illustrates the modular construction of the mobile communicator system which permits the various components relating to the keyboard, monitor and microprocessor related elements to be securely mounted to the upper and lower casings 230 and 250. Accordingly, the components within the mobile communicator system are protected from external shock and external conditions, including the feature of being water resistant.

Figure 15:
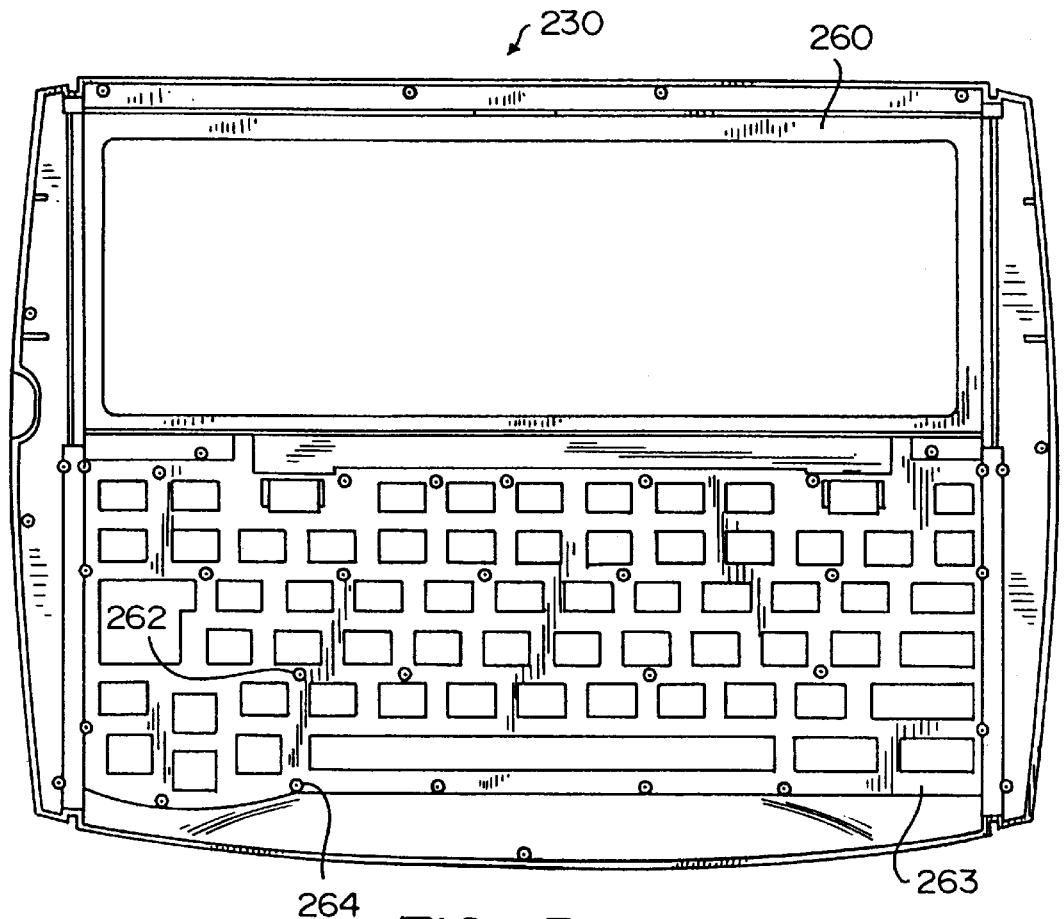
FIG. 15 is a top plan view of the upper casing in the mobile communicator system viewed from the inside.

FIG. 15 is a top plan view of the upper casing in the mobile communicator system viewed from the inside. No internal components of the mobile communicator system have been mounted to upper casing 230. As illustrated in FIG. 15, upper casing 230 includes protruding or elevated rod or stick-like portions 260 which extend around the monitor opening of upper casing 230. Elastomer sections 232a and 232b (shown in FIG. 14-1) are placed on elevated portions 260 and used as a seal for the monitor portion of the mobile communicator system, preventing or inhibiting the entrance of fluid therein. Keyboard template 263 includes female mounting connectors 262 and 264 which extend above the surface and which enter or penetrate through keyboard holes 235 in keyboard 86 (keyboard holes 235 and keyboard 86 are illustrated in FIG. 14-1).

Figure 16:
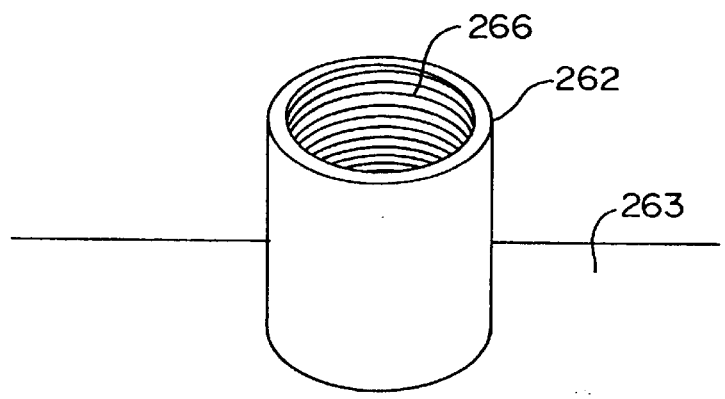
FIG. 16 is an enlarged view of a female connector in the upper casing of the mobile communicator system of FIG. 15.

FIG. 16 is an enlarged view of a female connector in the upper casing of the mobile communicator system of FIG. 15. As illustrated in FIG. 16, female connector 262 (or connector 264 in FIG. 15) is elevated and extends above keyboard template surface 263. Female connector 262 includes threaded portions 266 formed therein for receiving screws 240 (illustrated in FIG. 14-1) to mount the keyboard to the upper casing. Female connectors advantageously extend above surface 263 to enhance the water resistivity of the mobile communicator system and to firmly secure the keyboard to the upper casing. Thus, the keyboard is not only tightly secured around its outer edges to the upper casing, but also in various locations interior or more centrally located in the keyboard.

Figure 17:
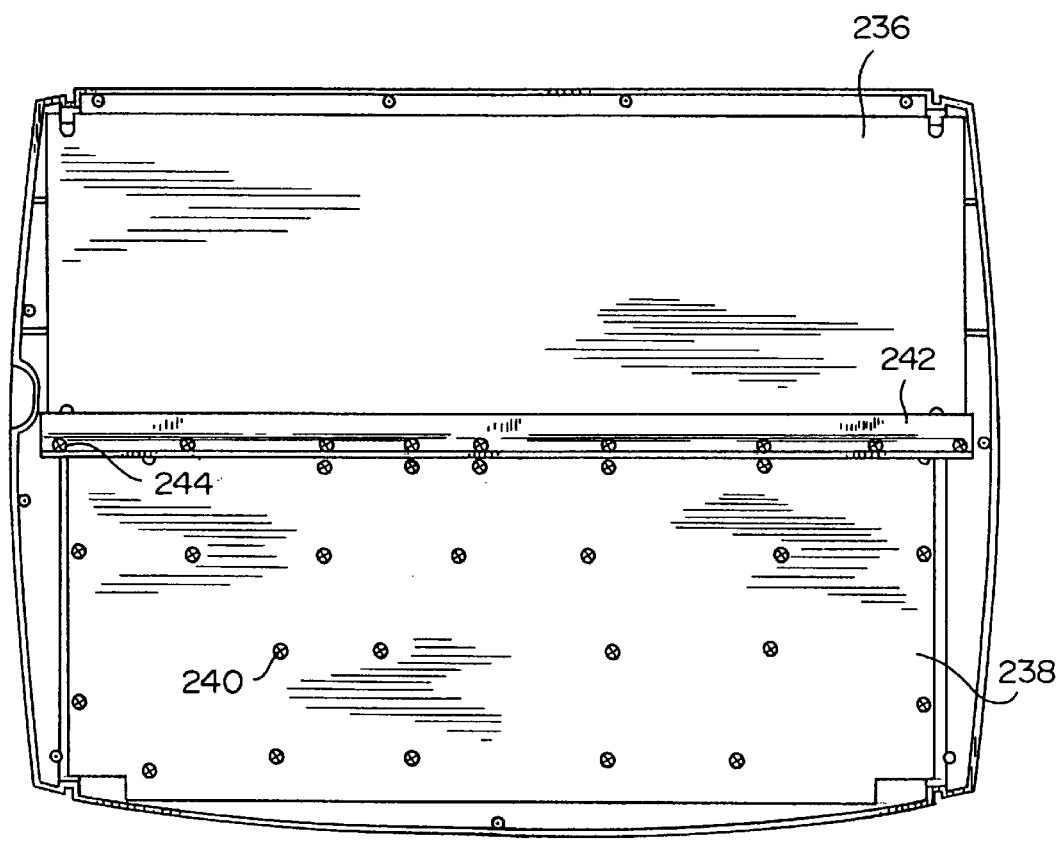
FIG. 17 is a top plan view of the mobile communicator system viewed from the inside when assembled.

FIG. 17 is a top plan view of the mobile communicator system viewed from the inside when assembled. As shown in FIG. 17, monitor 236 is secured by the pressure of mounting bracket being fixed to the upper casing via screws 244. Printed circuit board 238 (used in connection with the keyboard) is also mounted to the upper casing via screws 240.

Figure 18:
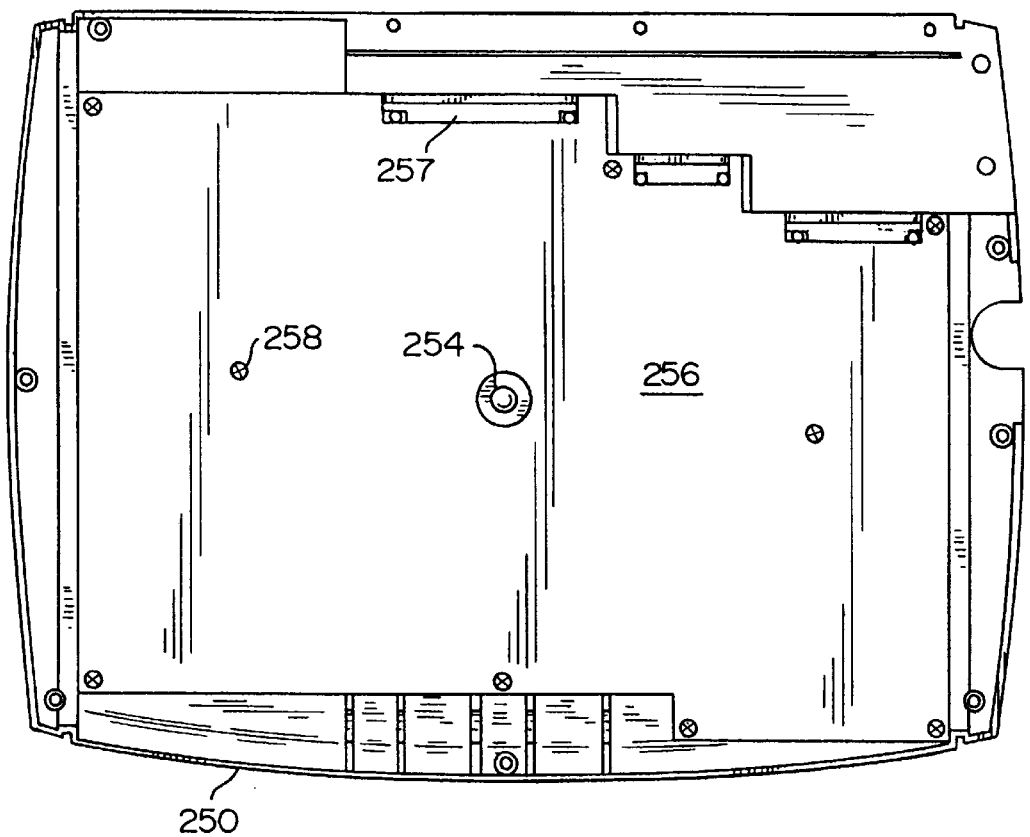
FIG. 18 is a bottom plan view of the mobile communicator system viewed from the inside when assembled.

FIG. 18 is a bottom plan view of the mobile communicator system viewed from the inside when assembled. As illustrated in FIG. 18, printed circuit board 256 is secured via screws 258 to the lower casing 250. Input/output ports 257 are positioned to cooperate with external holes (not shown) in the lower casing 250 for connection to external devices or destinations. Support 254 protrudes through a hole in printed circuit board 256, and prevents the lower and upper casings from buckling inward.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

What is claimed is:

1. A mobile communication system comprising:
    a housing comprised of a shock resistant material, said housing including end bumpers comprised of an elastomeric material for absorbing shock experienced by said housing;
    an input device for inputting data, said input device comprising a keyboard including a rubber/carbon membrane and mounted in said housing using a first seal to prevent fluid from entering the mobile communication system between said input device and said housing;
    a central processing unit, disposed in said housing, and receiving the data from said input device;
    a display monitor comprised of tempered glass having the ability to withstand a predetermined impact, said display monitor mounted in said housing using a second seal to prevent fluid from entering between said display monitor and said housing.

2. A mobile communication system comprising:
    a housing comprised of a shock resistant material, said housing including external elastomeric material for absorbing shock experienced by said housing;
    an input device for inputting data, said input device comprising a keyboard including a rubber/carbon membrane and mounted in said housing using a first seal to seal said input device to said housing to prevent fluid from entering the mobile communication system between said input device and said housing;
    a central processing unit, disposed in said housing, and receiving the data from said input device;
    a display monitor comprised of tempered glass having the ability to withstand a predetermined impact, said display monitor mounted in said housing using a second seal to prevent fluid from entering between said display monitor and said housing; and protruding semi-arc portions disposed on the bottom surface of the mobile communication system, the arc portions arranged in a semi-circular shape corresponding to the shape of a steering wheel in a vehicle, the arc portions configured to temporarily position the mobile communication system on the steering wheel for convenience of use.

3. A mobile communication system comprising:

a housing comprised of a shock resistant material, said housing including external elastomeric material for absorbing shock experienced by said housing;

an input device for inputting data, said input device comprising a keyboard including a rubber/carbon membrane and mounted in said housing using a first seal to seal said input device to said housing to prevent fluid from entering the mobile communication system between said input device and said housing;

a central processing unit, disposed in said housing, and receiving the data from said input device;

a display monitor comprised of tempered glass having the ability to withstand a predetermined impact, said display monitor mounted in said housing using a second seal to prevent fluid from entering between said display monitor and said housing; and cable organizer means, disposed on the bottom surface of the mobile communication system, for organizing cables to be connected to the mobile communication system and to inhibit interference among the cables.

4. A mobile communication system according to claim 3, wherein said cable organizer means includes a recessed portion in a rectangular shape disposed on the bottom surface of the mobile communication system having a depth substantially corresponding to a thickness of the cables, permitting the mobile communication system to rest levelly on a flat surface.

5. A mobile communication system according to claim 3, wherein said cable organizer means includes a recessed portion in a step-shape disposed on the bottom surface of the mobile communication system, and having a depth substantially corresponding to a thickness of the cables, permitting the mobile communication system to rest levelly on a flat surface.

6. A mobile communication system comprising:

a housing comprised of a shock resistant material, said housing including external elastomeric material for absorbing shock experienced by said housing;

an input device for inputting data, said input device comprising a keyboard including a rubber/carbon membrane and mounted in said housing using a first seal to seal said input device to said housing to prevent fluid from entering the mobile communication system between said input device and said housing;

a central processing unit, disposed in said housing, and receiving the data from said input device;

a display monitor comprised of tempered glass having the ability to withstand a predetermined impact, said display monitor mounted in said housing using a second seal to prevent fluid from entering between said display monitor and said housing; and end bumpers comprised of an elastomeric material for absorbing shock experienced by said housing, said bumper disposed on said housing inhibiting shock experience by the mobile communicator system.

7. A mobile communication system comprising:

a housing comprised of a shock resistant material, said housing including external elastomeric material for absorbing shock experienced by said housing;

an input device for inputting data, said input device comprising a keyboard including a rubber/carbon membrane and mounted in said housing using a first seal to seal said input device to said housing to prevent fluid from entering the mobile communication system between said input device and said housing;

a central processing unit, disposed in said housing, and receiving the data from said input device;

a display monitor having the ability to withstand a predetermined impact, said display monitor mounted in said housing using a second seal to prevent fluid from entering between said display monitor and said housing; and at least one bumper comprised of an elastomeric material on the exterior of said housing for absorbing shock experienced by said housing, said at least one bumper disposed on said housing inhibiting shock experience by the mobile communication system.

8. A mobile communication system includes a bracing system for protecting and securing the internal components, the bracing system comprising:

an upper housing comprised of shock resistant material, including a monitor cavity;

elastomer sections forming a first seal between said monitor cavity and said upper housing;

a breakage resistant transparent material placed on said elastomer sections and in conformity with said monitor cavity;

a display monitor being protected by said breakage resistant material;

a shock absorbing material disposed around the peripheries of said breakage resistant transparent material and said display monitor;

a bias device biasing said display monitor to said upper housing and said breakage resistant material;

a keyboard formed of a water resistant material including elevated keys; and a first printed circuit board including switches selectively activated in response to depression of said elevated keys; and a lower housing comprised of another shock resistant material and including a second printed circuit board including a central processing unit, and mounted to said lower housing, and receiving data from or transmitting data to an external device or destination.

9. A bracing system according to claim 8, further comprising protruding semi-arc portions disposed on the bottom surface of the mobile communication system, the arc portions arranged in a semi-circular shape corresponding to the shape of a steering wheel in a vehicle, the arc portions configured to temporarily position the mobile communication system on the steering wheel for convenience of use.

10. A bracing system according to claim 8, further comprising cable organizer means, disposed on the bottom surface of the mobile communication system, for organizing cables to be connected to the mobile communication system and to inhibit interference among the cables.

11. A bracing system according to claim 10, wherein said cable organizer means includes a recessed portion in a rectangular shape disposed on the bottom surface of the mobile communication system having a depth substantially corresponding to a thickness of the cables, permitting the mobile communication system to rest levelly on a flat surface.

12. A bracing system according to claim 10, wherein said cable organizer means includes a recessed portion in a step-shape disposed on the bottom surface of the mobile communication system, and having a depth substantially corresponding to a thickness of the cables, permitting the mobile communication system to rest levelly on a flat surface.

13. A bracing system according to claim 8, wherein the shock resistant material comprises a polycarbonate type material.

14. A bracing system according to claim 8, wherein said shock absorbing material comprises silicon foam and is attached to one of said breakage resistant material and said display monitor using an adhesive.

15. A bracing system according to claim 8, further comprising end bumpers comprised of an elastomeric material for absorbing shock experienced by said upper and lower housings, said end bumpers disposed on opposite ends of said upper and lower housings inhibiting shock experience by the mobile communication system.

16. A bracing system according to claim 8, wherein said breakage resistant transparent material comprises tempered glass.

17. A bracing system according to claim 16, wherein the tempered glass comprises heat treated tempered glass.

18. A bracing system according to claim 8, further comprising a support mounted to said lower housing and extending in a direction toward said upper housing and through said second printed circuit board, preventing said upper and lower housings from collapsing inwardly, and wherein the support further includes a shock absorbing member disposed on an upper surface of the support for facing said upper housing.

19. A bracing system according to claim 8, wherein said upper housing further comprises another shock absorbing material disposed around the peripheries of said breakage resistant transparent material and said upper housing, said another shock absorbing material mounted to at least one of said breakage resistant transparent material and said upper housing.

20. A method of assembling the internal components of the mobile communicator system having upper and lower housings, comprising the steps of:
  (a) assembling an upper housing comprised of a shock resistant material and having a monitor cavity and keyboard receiving area, including the steps of
    (a1) positioning elastomer sections around the monitor cavity;
    (a2) positioning a breakage resistant transparent material on the elastomer sections and in conformity with the monitor cavity, the elastomer sections forming a first seal between the monitor cavity and the breakage resistant transparent material;
    (a3) positioning a shock absorbing material disposed around the peripheries of the breakage resistant transparent material;
    (a4) positioning a display monitor on the shock absorbing material, the shock absorbing material positioned between the display monitor and the breakage resistant transparent material;
    (a5) securing said display monitor to the upper housing;
    (a6) positioning a water resistant keyboard in the keyboard receiving area;
    (a7) positioning a printed circuit board switch array on the keyboard;
    (a8) securing the peripheries of the printed circuit board and the keyboard to the upper housing through first mounting holes on the periphery of the keyboard;
  (b) assembling a lower housing comprised of another shock resistant material, including the step of securing a second printed circuit board including a central processing unit; and
  (c) assembling the upper and lower housings together.

21. A method according to claim 20, further comprising the step of securing bumper on the assembled upper and lower housings.

22. A method according to claim 20, wherein said securing step (a8) further comprises the step of securing the internal areas of the printed circuit board and the keyboard to the upper housing through second mounting holes between selected keys of the keyboard.

23. A mobile communication system comprising:
  a housing comprised of a shock resistant material, said housing including external elastomeric material for absorbing shock experienced by said housing;
  an input device for inputting data, said input device comprising a keyboard including a rubber/carbon membrane and mounted in said housing using a first seal to secure said input device to said housing to prevent fluid from entering therethrough;
  a central processing unit, disposed in said housing, and receiving the data from said input device;
  a display monitor comprised of breakage resistant material having the ability to withstand a predetermined impact, said display monitor mounted in said housing using a second seal to prevent fluid from entering between said display monitor and said housing; and
  at least one support mounted in said housing and extending in a substantially perpendicular direction, preventing said housing from collapsing inwardly, and wherein the support further includes a shock absorbing member disposed on an upper surface of the support.

24. A mobile communication system comprising:
  housing means including bumpers comprised of an elastomeric material for absorbing shock experienced by said housing;
  input means for inputting data;
  a central processing unit for receiving the data from said input device;
  a display monitor comprised of breakage resistant material having the ability to withstand a predetermined impact, said display monitor mounted in said housing using a second seal; and
  at least one support mounted in said housing and extending in a substantially perpendicular direction, preventing said housing from collapsing inwardly, and wherein the support further includes a shock absorbing member disposed on an upper surface of the support.

25. A mobile communication system comprising:
  a housing including bumpers comprised of an elastomeric material to absorb shock experienced by said housing;
  an input device used to input data;
  a central processing unit for receiving the data from said input device;
  a display monitor comprised of breakage resistant material having the ability to withstand a predetermined impact, said display monitor mounted in said housing using a second seal; and
  at least one support mounted in said housing and extending in a substantially perpendicular direction, preventing said housing from collapsing inwardly, and wherein the support further includes a shock absorbing member disposed on an upper surface of the support.

* * * * *